United States Patent [19]
Tanimura

[11] Patent Number: 5,752,039
[45] Date of Patent: May 12, 1998

[54] EXECUTABLE FILE DIFFERENCE EXTRACTION/UPDATE SYSTEM AND EXECUTABLE FILE DIFFERENCE EXTRACTION METHOD

[75] Inventor: Morimasa Tanimura, Tokyo, Japan

[73] Assignee: NTT Data Communications Systems Corp., Tokyo, Japan

[21] Appl. No.: 343,444

[22] PCT Filed: Mar. 22, 1994

[86] PCT No.: PCT/JP94/00454

§ 371 Date: Nov. 21, 1994

§ 102(e) Date: Nov. 21, 1994

[87] PCT Pub. No.: WO94/22086

PCT Pub. Date: Sep. 29, 1994

[30] Foreign Application Priority Data

Mar. 22, 1993 [JP] Japan ........................... 5-062181

[51] Int. Cl.⁶ ........................................... G06F 17/30
[52] U.S. Cl. ........................................ 395/712; 707/203
[58] Field of Search ........................... 395/600, 700, 395/617, 619, 712; 364/419.19

[56] References Cited

U.S. PATENT DOCUMENTS

| | | | |
|---|---|---|---|
| 3,711,863 | 1/1973 | Bloom | 395/183.14 |
| 5,191,646 | 3/1993 | Naito et al. | 395/161 |
| 5,479,654 | 12/1995 | Squibb | 395/600 |

FOREIGN PATENT DOCUMENTS

| | | |
|---|---|---|
| 59-106063 | 6/1984 | Japan . |
| 63-76031 | 4/1988 | Japan . |
| 4165434 | 6/1992 | Japan . |
| 4362735 | 12/1992 | Japan . |

OTHER PUBLICATIONS

Brown, A., "DeltaFile: easy upgrades.", DBMS, v4, n9, pp. 36–37, Aug. 1991.

Coffee, P., "Two Approaches to managing file differences:PocketSoft's RTPatch delivers reliable file upgrades", PC Week, v8, n32, p. 51, Aug. 1991.

Primary Examiner—Thomas G. Black
Assistant Examiner—Jack M. Choules
Attorney, Agent, or Firm—Greer, Burns & Crain, Ltd.

[57] ABSTRACT

A header analyzing unit extracts a header area and each table unit area in each of an old and a new executable files, and calls a difference extracting unit for each area. A segment data associating unit associates a segment data in the old executable file with a corresponding segment data in the new executable file, and calls the difference extracting unit for the associated areas. A resource associating unit associates a resource data in the old executable file with a corresponding resource data in the new executable file, and calls the difference extracting unit for the associated areas. The difference extracting unit extracts the differences in byte units between the new and the old executable files from start to end in a specified area, and saves the differences in an update file.

7 Claims, 31 Drawing Sheets

| SIZE | OFFSET | CONTENTS | |
|---|---|---|---|
| 1 WORD | 0h | IDENTIFIER 'MZ' | PARTS OF DOS EXE HEADER |
| | : | | |
| 1 WORD | 18h | OS/2 EXE IDENTIFIER=0X40 | |
| | : | | |
| 1 WORD | 3Ch | OFFSET TO OS/2 EXE | |

| | SIZE | OFFSET | CONTENTS | |
|---|---|---|---|---|
| | 1 WORD | 0h | IDENTIFIER 'NE' | PARTS OF OS/2 exe HEADER |
| | 1 BYTE | 2h | VERSION NUMBER OF LINKER | |
| | 1 BYTE | 3h | REVISION NUMBER OF LINKER | |
| ● | 1 WORD | 4h | OS/2 EXE RELATIVE OFFSET OF EXPORT ENTRY TABLE | |
| ● | 1 WORD | 6h | BYTE SIZE OF EXPORT ENTRY TABLE | |
| | 2 WORD | 8h | CRC-32 | |
| | 1 WORD | Ch | FLAG VALUE<br>8XXXh → DLL<br>00XXh → NOT SPECIFIED<br>01XXh → NOT WINDOW COMPAT (EXCLUSIVE FOR FULL SCREEN)<br>02XXh → WINDOW COMPAT (OPERATED IN PM SESSION)<br>03XXh  WINDOW API (AT OF PM) | |
| | 1 WORD | Eh | SEGMENT NUMBER OF AUTOMATIC DATA SEGMENT | |
| | 1 WORD | 10h | LOCAL HEAP SIZE | |
| | 1 WORD | 12h | STACK SIZE | |
| | 2 WORD | 14h | CS:IP ADDRESS | |
| | 2 WORD | 18h | SS:SP ADDRESS | |
| ● | 1 WORD | 1Ch | NUMBER OF ITEMS ON SEGMENT TABLE | |
| | 1 WORD | 1Eh | NUMBER OF ENTRIES ON MODULE REFERENCE TABLE | |
| ● | 1 WORD | 20h | BYTE SIZE OF NON-RESIDENT NAME TABLE | |
| ● | 1 WORD | 22h | OS/2 EXE RELATIVE OFFSET OF SEGMENT TABLE | |

Fig. 7A

| • | 1 WORD | 24h | OS/2 EXE RELATIVE OFFSET OF RESOURCE TABLE |
|---|---|---|---|
| • | 1 WORD | 26h | OS/2 EXE RELATIVE OFFSET OF RESIDENT NAME TABLE |
| • | 1 WORD | 28h | OS/2 EXE RELATIVE OFFSET OF MODULE REFERENCE TABLE |
| • | 1 WORD | 2Ah | OS/2 EXE RELATIVE OFFSET OF IMPORT NAME TABLE |
| • | 2 WORD | 2Ch | OFFSET FROM START OF FILE ON NON-RESIDENT NAME TABLE |
|   | 1 WORD | 30h | NUMBER OF MOVABLE ENTRIES |
|   | 1 WORD | 32h | SEGMENT BOUNDARY SHIFT COUNT(VALUE OF X IN 2*) |
| • | 1 WORD | 34h | NUMBER OF RESOURCE TABLE ENTRIES |
|   | 1 BYTE | 36h | OS TYPE (1=OS/2) |

• MARKED VALUE STORES IN VARIABLE FOR OLD AND NEW FILES
AREAS AT AND AFTER 37th ARE USED EXCLUSIVELY BY WINDOWS (TRADEMARK OF MICROSOFT IN U.S.), AND ARE NOT USED BY OS/2. THERFORE, DIFFERENCES ARE EXECUTED BY SIMPLE COMPARISONN.

Fig. 7B

| VARIABLE | CONTENTS OF DATA |
|---|---|
| entrytbl_off | OS/2 EXE RELATIVE OFFSET ON EXPORT ENTRY TABLE |
| entrytbl_len | BYTE SIZE OF EXPORT ENTRY TABLE |
| segtbl_cnt | NUMBER OF ITEMS ON SEGMENT TABLE |
| segtbl_off | OS/2 EXE RELATIVE OFFSET ON SEGMENT TABLE |
| resnamtbl_off | OS/2 EXE RELATIVE OFFSET ON RESIDENT NAME TABLE |
| modref_off | OS/2 EXE RELATIVE OFFSET ON MODULE REFERENCE TABLE |
| importnam_off | OS/2 EXE RELATIVE OFFSET ON IMPORT NAME TABLE |
| nonresnam_len | LENGTH OF RESIDENT NAME TABLE |
| nonresnam_off | OFFSET FROM START OF FILE ON NON-RESIDENT NAME TABLE |
| resrctbl_off | OS/2 EXE RELATIVE OFFSET ON RESOURCE TABLE |
| resrctbl_cnt | NUMBER OF ENTRIES ON RESOURCE TABLE |

| SIZE | OFFSET | CONTENTS |
|---|---|---|
| 1 BYTE | 0h | BYTE LENGTH OF CHARACTER STRING, 0=TABLE END |
| n BYTE | 1h | NAME STRING |
| 1 WORD | n+1h | INDEX OF ENTRY TABLE |

Fig. 11

| SIZE | | CONTENTS |
|---|---|---|
| 1 BYTE | 0h | BYTE LENGTH OF CHARACTER STRING, 0=TABLE END |
| n BYTE | 1h | NAME STRING |

| SIZE | OFFSET | CONTENTS |
|---|---|---|
| 1 WORD | 0h | RESOURCE TYPE ID |
| 1 WORD | 2h | RESOURCE NAME ID |

Fig. 13

OLD EXE FILE

| Seg No. | offset | Size | Type |
|---|---|---|---|
| 1 | 1123 | 8000 | CODE, LOADONCALL.... |
| 2 | 2000 | 3000 | DATA, ... |
| 3 | 3000 | 4000 | CODE, PRELOAD ... |
| 4 | 3500 | 3000 | DATA, ... |

Fig. 15A

NEW EXE FILE

| Seg No. | offset | Size | Type |
|---|---|---|---|
| 1 | 1123 | 8000 | CODE, LOADONCALL.... |
| 2 | 2000 | 3000 | DATA, ... |
| 3 | 3000 | 4000 | DATA, ... |
| 4 | 4000 | 4000 | CODE, PRELOAD ... |

Fig. 15B

UNSORTED OLD FILE

| | |
|---|---|
| ID = 4 | offset = 1000 |
| ID = 7 | offset = 3000 |
| ID = 6 | offset = 4000 |
| ID = 5 | offset = 8000 |
| ID = 10 | offset = 6000 |
| ID = 15 | offset = 5000 |
| ID = 30 | offset = 7000 |
| ID = 8 | offset = 2000 |

NEW FILE

| | |
|---|---|
| ID = 4 | offset = 1000 |
| ID = 7 | offset = 3000 |
| ID = 5 | offset = 8000 |
| ID = 10 | offset = 6000 |
| ID = 15 | offset = 5000 |
| ID = 30 | offset = 7000 |
| ID = 8 | offset = 2000 |
| ID = 38 | offset = 6500 |
| ID = 9 | offset = 3500 |

Fig. 19A

SORTED OLD FILE

| | |
|---|---|
| ID = 4 | offset = 1000 |
| ID = 8 | offset = 2000 |
| ID = 7 | offset = 3000 |
| ID = 6 | offset = 4000 |
| ID = 15 | offset = 5000 |
| ID = 10 | offset = 6000 |
| ID = 30 | offset = 7000 |
| ID = 5 | offset = 8000 |

NEW FILE

| | |
|---|---|
| ID = 4 | offset = 1000 |
| ID = 8 | offset = 2000 |
| ID = 7 | offset = 3000 |
| ID = 9 | offset = 3500 |
| ID = 15 | offset = 5000 |
| ID = 10 | offset = 6000 |
| ID = 38 | offset = 6500 |
| ID = 30 | offset = 7000 |
| ID = 5 | offset = 8000 |

Fig. 19B

FILE STRUCTURE

| Record ID | Data Offset | Data Length | Data [n] |
|---|---|---|---|
| ... | ... | ... | ... |

Fig. 29A

MEANINGS OF Record ID

| Record ID | MEANING | REMARKS |
|---|---|---|
| 0 | REPLACING RECORD | DataLength INDICATES DATA LENGTH OF REPLACED/ADDED DATA |
| 1 | ADDED RECORD | |
| 2 | DELETED RECORD | DataLength INDICATES NUMBER OF DELETED BYTES, NO DATA EXIST. |

Fig. 29B

EXECUTABLE FILE DIFFERENCE EXTRACTION/UPDATE SYSTEM AND EXECUTABLE FILE DIFFERENCE EXTRACTION METHOD

TECHNICAL FIELD

The present invention relates to an executable file difference extraction/update system and method for generating a new executable file from an old executable file and an update file which is obtained by extracting the difference between the new executable file and the old executable file when an executable file is updated to delete a bug or partially extend capacities.

BACKGROUND ART

When a user is provided with an executable file (hereinafter referred to as an EXE file) which presents the user with a specific service, the executable file provided for the user may possibly be updated from an old EXE file to a new EXE file as shown in FIG. 1A so that a bug existing in the executable file can be deleted or the function realized by the executable file can be partially extended.

Lately, since the capabilities of computer systems have been strikingly developed, and the program size of an executable file can be some hundred kilobytes through some megabytes, or as much as some tens of megabytes. Therefore, providing a new EXE file for use in updating the above described executable file requires an uneconomically large data capacity of its media.

For example, if the provided media are incorporated into the network as shown in FIG. 2, the host computer HOST of a center TC transmits a new EXE file to the host computer HOST through communications circuits. When the new EXE file is a large size file as described above, a large amount of communications circuit fee is charged to the system.

Conventionally, to solve the problem, an old EXE file is compared with a new EXE file as shown in FIG. 1B instead of providing the new EXE file as is, and then an update file is generated by extracting the difference between the new EXE file and the old EXE file. Thus, the update file is provided for a user. In this case, the user generates a new EXE file from the new EXE file and the old EXE file through the update process according to a predetermined update program as shown in FIG. 1B. Since the new and old EXE files share a good many of the same program codes, the size of the update file, that is, the difference between the old and new EXE files, is normally smaller than the size of the new EXE file. Accordingly, providing the update file to the user requires a smaller capacity of media.

In the example shown in FIG. 2, the host computer HOST of the center TC transmits the update file to the host computer HOST of the office TC through communications circuits. The host computer HOST of the office TC has its central communications unit receive the update file and activate the update program to generate a new EXE file from the old EXE file and the update file. The new EXE file is stored in a first disk and a second disk through a file manipulating unit. Then, the host computer HOST of the office TC has its communications management unit transmit the new EXE file from its intra-office communications unit to a client server CSV through a LAN (local area network). The client server CSV has its intra-office communications unit receive the new EXE file. The received new EXE file is stored in the first and second files through the file manipulating unit.

DISCLOSURE OF INVENTION

However, in the conventional difference extraction method, it is determined whether or not data match in byte units between the new and old EXE files from beginning to end. Then, non-coincident data are extracted as difference data. If, for example, a single byte of data is added to or deleted from the new EXE file, then all the data preceded by the added or deleted byte do not match between the old and new EXE files. As a result, the size of the update file becomes undesirably large. Therefore, the communications circuits cannot be utilized more efficiently when the update file is transmitted over a network as shown in the example in FIG. 2 than when the new EXE file is transmitted as is.

The present invention aims to reduce the size of the update file.

The executable file difference extraction device of the present invention is structured as follows.

A logic unit area dividing unit divides each of an old executable file and a new executable file into a plurality of logic unit areas each of which has a predetermined function. A logic unit area can be, for example, a segment area, resource area, header area, table area, section directory area, or section area, etc.

A logic unit area associating unit associates each logic unit area in the old executable file with a functionally corresponding logic unit area in the new executable file.

A difference extracting unit extracts difference information between data in the logic unit area in the old executable file and the functionally corresponding logic unit area in the new executable file associated by the logic unit area associating unit. The difference information contains, for example, attribute information about the addition, deletion, or replacement of data in the old executable file to generate the new executable file; data length information about the added, deleted, or replaced data; and the data themselves involved.

An update file generating unit stores in an update file the difference extracted by the difference extracting unit, and the difference information about the area in the old executable file or the new executable file not associated by the logic unit area associating unit.

Furthermore, the present invention, as an executable file updating device, sequentially retrieves the difference information from the update file generated by the above described update file generating unit. It also comprises a file updating unit for generating a new executable file based on the difference information and the old executable file.

When a difference extracting process is performed in, for example, an OS/2 system (the trademark of IBM in the U.S.; The trademark appears in the Specification and the Drawings of the present invention) according to the present invention, the data in the executable files are associated for each logic unit area such as an area in a DOS EXE format area, an OS/2 EXE header area, a table area, a segment data area, and a resource area. After these areas have been associated, the difference extracting process is carried out. With an executable file in, for example, a Windows NT system (the trademark of Microsoft in the U.S.; The trademark appears in the Specification and the Drawings of the present invention), the data in the executable files are associated for each logic unit area such as an EXE header area, a Windows NT EXE header area, a section directory area, and a section area. After these areas have been associated, the difference extracting process is carried out.

Thus, data in corresponding areas between an old executable file and a new executable file match at a high rate, and the size of a generated update file is considerably reduced.

BRIEF DESCRIPTION OF DRAWINGS

FIG. 7, which is divided into two sections 7A and 7B, shows the structure of the data of the DOS EXE header and the OS/2 EXE header;

FIG. 8 shows the OS/2 EXE header information;

FIG. 10 shows the structure of the data on the resident/non-resident name table unit;

FIG. 11 shows the structure of the data on the import name table unit;

FIG. 13 shows the structure of the data on the resource table unit;

FIGS. 15A and 15B show the arrangement of the segments of the old EXE file and the new EXE file;

FIGS. 19A and 19B show the arrangement of the resources of the old and new EXE files;

FIGS. 29A and 29B shows the structure of the data of an update file; and

BEST MODE FOR PRACTICING THE INVENTION

The best mode for practicing the present invention is explained below in detail by referring to the attached drawings.

Figure 1:
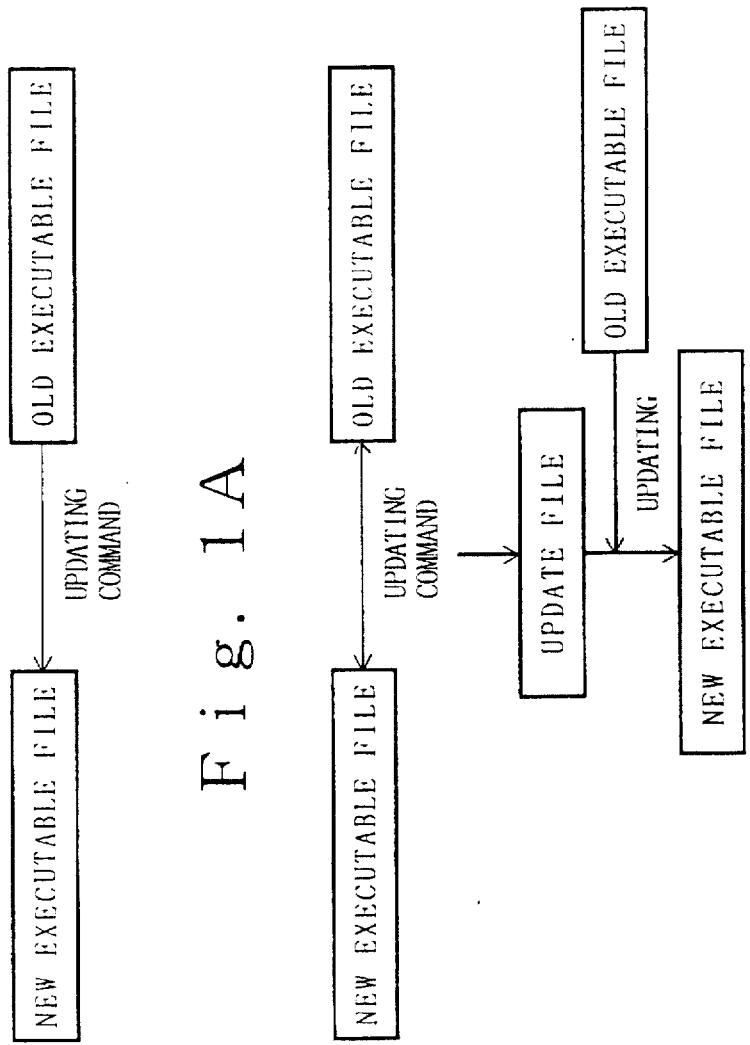
FIGS. 1A and 1B show an updating of a file.
Figure 2:
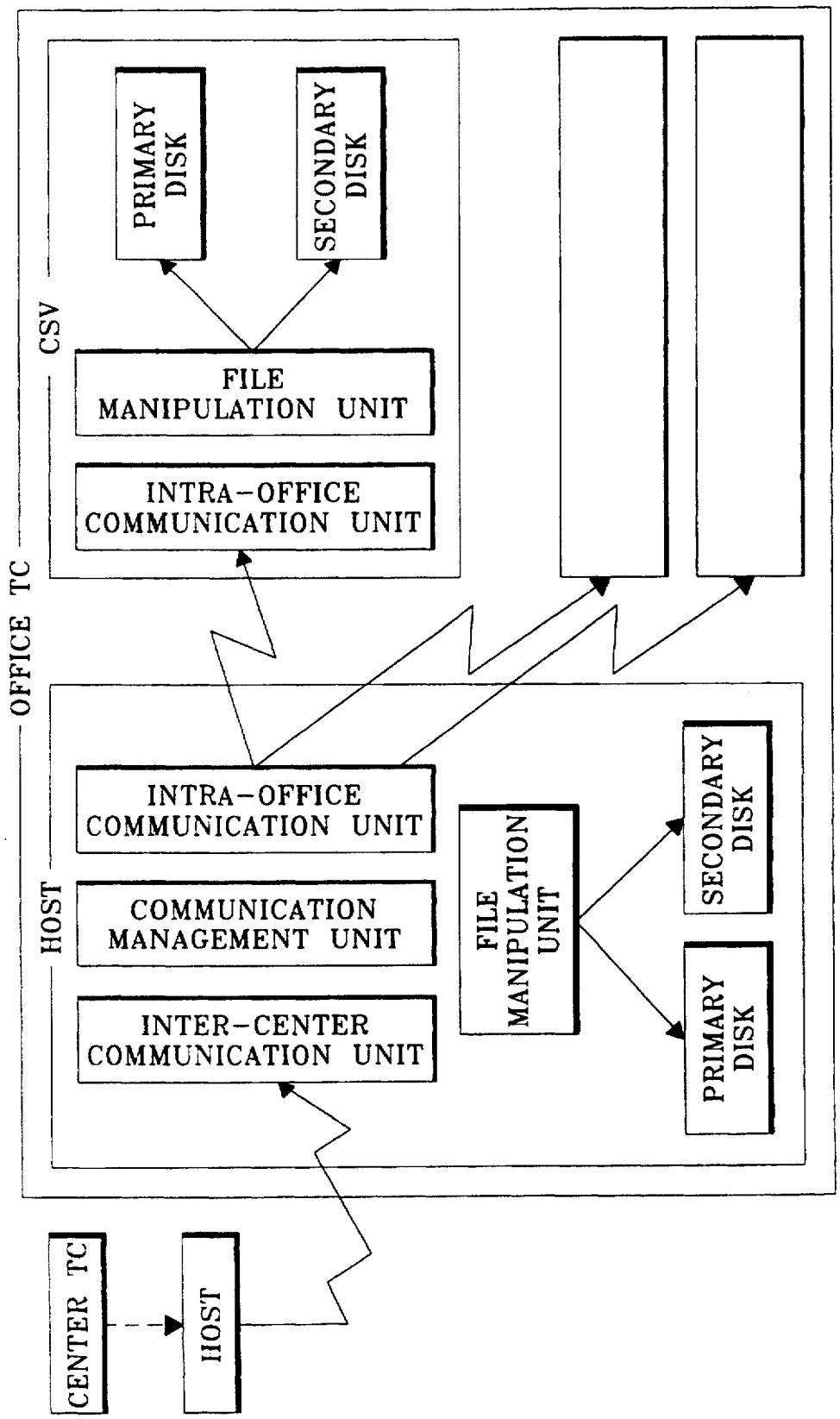
FIG. 2 shows the environment in which a file is updated.
Figure 3:
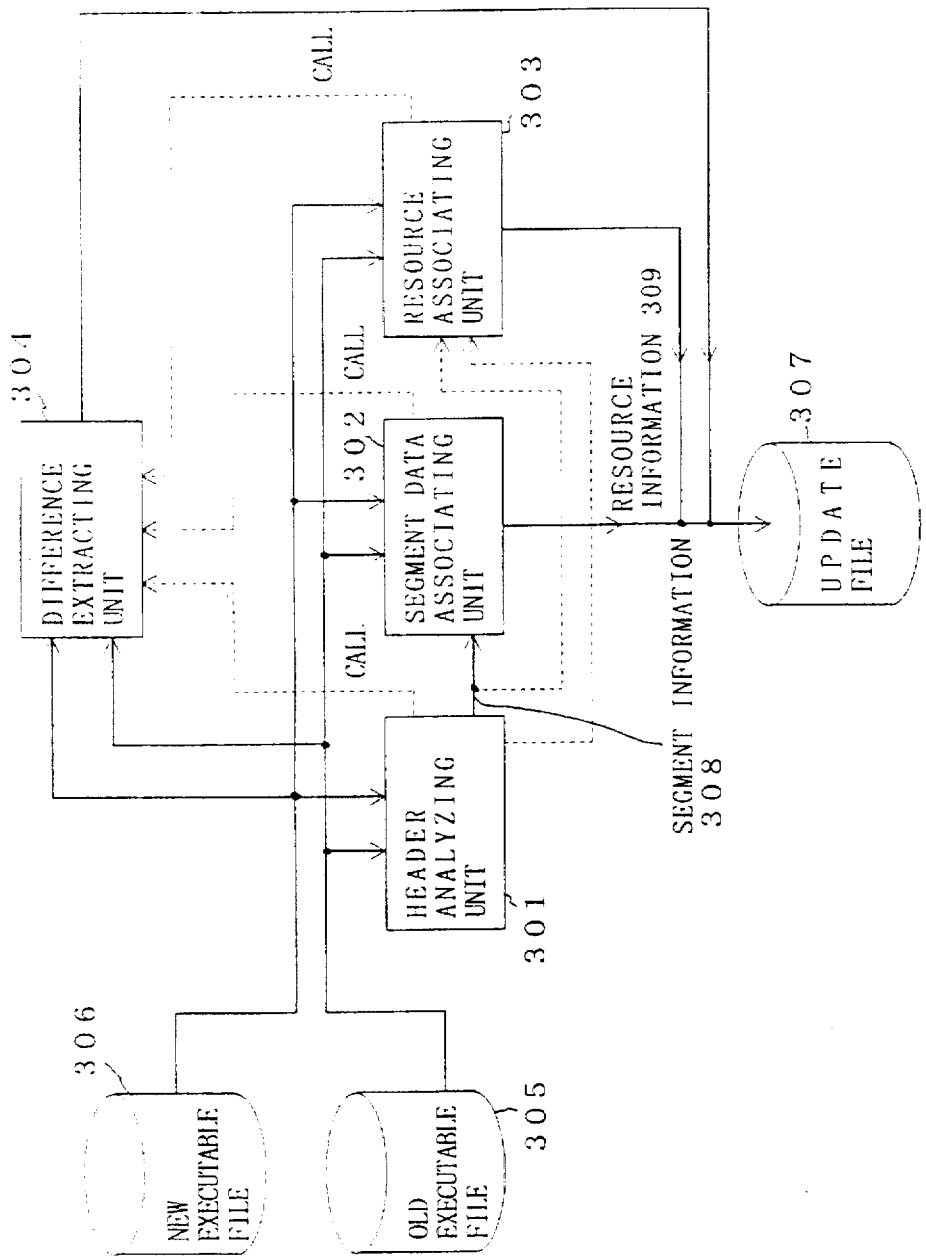
FIG. 3 shows the configuration of a preferred embodiment of the present invention.

FIG. 3 shows the configuration of a preferred embodiment of the present invention.

A difference extracting unit 304 extracts the difference in byte units between a new EXE file 306 and an old EXE file 305 from beginning to end in the areas specified by a header analyzing unit 301, a segment data associating unit 302, or a resource associating unit 303. Then, the difference extracting unit 304 saves the difference in an update file 307.

The header analyzing unit 301 extracts the areas of the DOS EXE header and the OS/2 EXE header of the old EXE file 307 and the new EXE file 306, and instructs the difference extracting unit 304 to perform the difference extracting process. The header analyzing unit 301 extracts the area on each table described later by analyzing the contents of the extracted DOS EXE header and the OS/2 EXE header in the old EXE file 305 and the new EXE file 306, and instructs the difference extracting unit 304 to perform the difference extracting process on each of the extracted table areas. Furthermore, the header analyzing unit 301 extracts a segment information 308 described later from the extracted segment table unit in the old EXE file 305 and the new EXE file 306, and sends it to the segment data associating unit 302 and the resource associating unit 303. Then, it extracts a resource information 309 described later from the extracted resource table unit and sends it to the resource associating unit 303.

The segment data associating unit 302 associates segment data between the old EXE file 305 and the new EXE file 306 according to the segment information 308 from the header analyzing unit 301. The segment data associating unit 302 instructs the difference extracting unit 304 to perform the difference extracting process on a pair of the associated segment data. If the new EXE file 306 does not contain data corresponding to the segment data stored in the old EXE file 305, then the difference information instructing the deletion of the segment date is stored in the update file 307. On the other hand, unless the old EXE file 305 contains data corresponding to the segment data stored in the new EXE file 306, the difference information instructing the addition of the segment data is stored in the update file 307.

The resource associating unit 303 associates the resources between the old EXE file 305 and the new EXE file 306 according to the segment information 308 and the resource information 309 from the header analyzing unit 301. The resource associating unit 303 instructs the difference extracting unit 304 to perform the difference extracting process on a pair of the associated resources. If the new EXE file 306 does not contain data corresponding to the resources stored in the old EXE file 305, then the difference information instructing the deletion of the resources is stored in the update file 307. On the other hand, unless the old EXE file 305 contains data corresponding to the resources stored in the new EXE file 306, the difference information instructing the addition of the resources is stored in the update file 307.

Explained below is the operation of the embodiment having the above described configuration.

Figure 4:
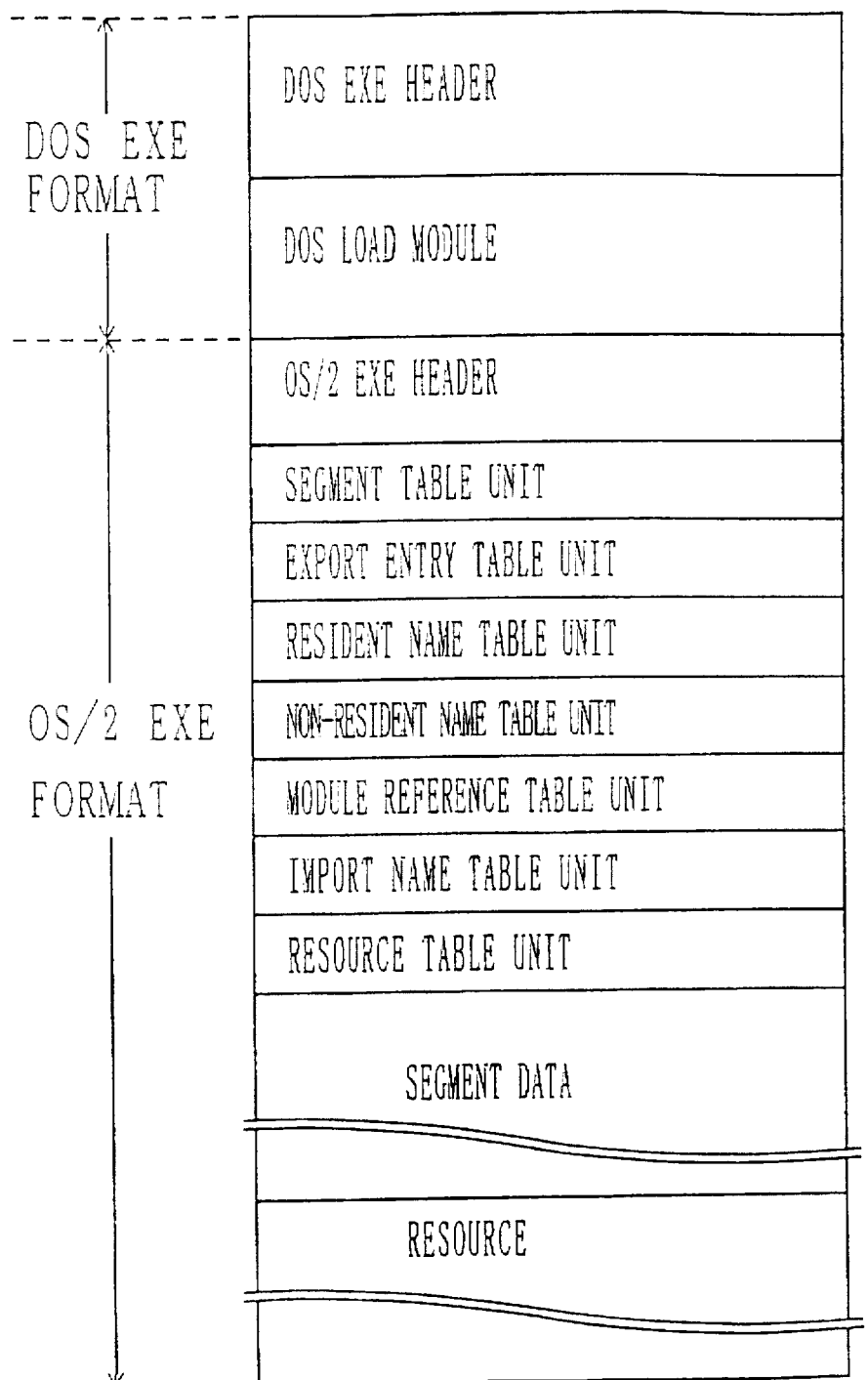
FIG. 4 shows a file format according to a preferred embodiment of the present invention.

FIG. 4 shows a file format shared by the old EXE file 305 and the new EXE file 306.

The object file in the present embodiment is an EXE file executable in the OS/2 EXE which is one of the multitask operating systems for computers. The present invention is not limited to these files, but can also be applied to EXE files executable in, for example, the Windows NT operating system as described later.

The EXE file structured as shown in FIG. 4 is designed to be executable in the MS-DOS system, that is, one of the conventional single task operating systems for computers. Therefore, the EXE file comprises the area in the DOS EXE format and that in the OS/2 EXE format as shown in FIG. 4.

The first half of the file is designed in the DOS EXE format. The area in the DOS EXE format consists of a DOS EXE header area storing various information for the execution of an MS-DOS program, pointer information pointing to an OS/2 EXE header described later, etc. and a DOS load module area storing the body of a program operating in an MS-DOS system.

The second half of the file is designed in the OS/2 EXE format. The area in the OS/2 EXE format consists of an OS/2 EXE header area storing various information for the execution of an OS/2 program, pointer information pointing to various table units described later, etc., a segment data area storing the body of a program operating in an OS/2 system, and a resource area storing data referred to as resources for use in the OS/2 program.

A difference (between the old EXE file 305 and the new EXE file 306) extracting process is performed in the present embodiment on each of the areas in the DOS EXE format, the OS/2 EXE header, and the table unit. Then, the segment data and the resources are associated between the old EXE file 305 and the new EXE file 306. The difference extracting process is performed for each area of a pair of the associated segment data or resources. Thus, executing the difference extracting process for each logical unit considerably reduces the size of the generated update file 307 as compared with the conventional technologies.

Described below are the operations of the header analyzing unit 301, the segment data associating unit 302, the resource associating unit 303, and the difference extracting unit 304.

Figure 5:
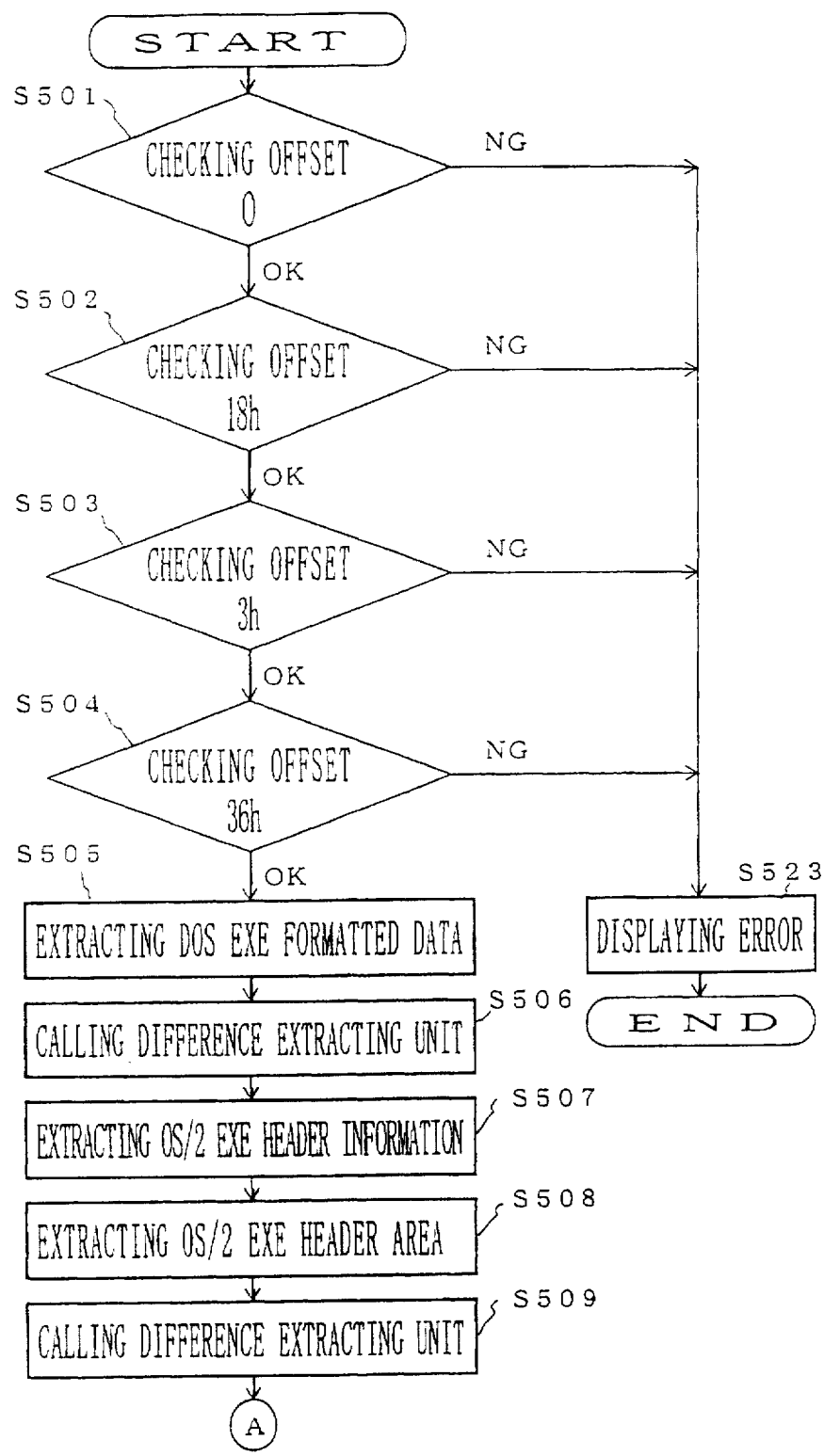
FIG. 5 is a flowchart (1) of the operation of the header analyzing unit.
Figure 6:
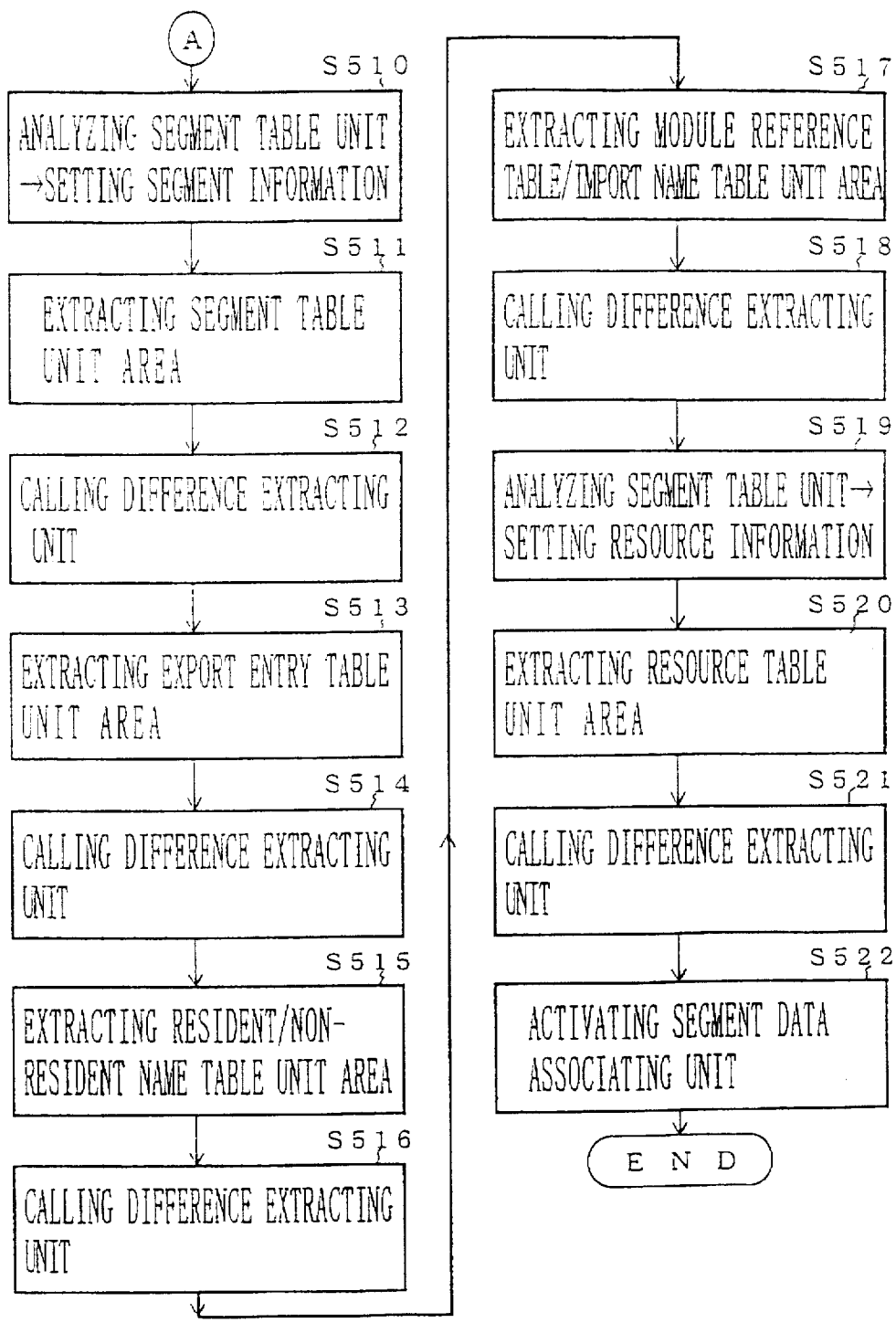
FIG. 6 is a flowchart (2) of the operation of the header analyzing unit.

The header analyzing unit 301 is activated first according to the present embodiment. FIGS. 5 and 6 are operational flowcharts showing the processes performed by the header analyzing unit 301. The operation of the header analyzing unit 301 is realized as a part of the operations performed on the old EXE file 305 and the new EXE file 306 stored in, for example, a disk device by the central processing unit (CPU) for executing a control program stored in a memory in a computer system not shown in the drawings.

First, in step S501, it is determined whether or not a 1-word code stored at the file offset 0 is MZ in the DOS EXE header in the old EXE file 305 and the new EXE file 306 (refer to FIG. 7). If the code is not MZ, then the file is not an EXE file, and an error message is output, terminating the difference extracting process in step S523.

If the code is MZ, it is determined whether or not the value stored at the file offset 18h ("h" indicates that a 1-word value followed by "h" is a hexadecimal value) in the DOS EXE header is 40 h in the old EXE file 305 and the new EXE file 306 in step S502 (refer to FIG. 7, which is divided into two sections 7A and 7B). If the value is not 40 h, then the file is not designed in the OS/2 EXE format, an error message is output, and the difference extracting process terminates in step S523.

If the above described value is 40 h, then it is determined whether or not a 1-word offset address stored at the file offset 3Ch in the DOS EXE header refers to an address in the area of the OS/2 EXE format in the old EXE file 305 and the new EXE file 306 in step S503 (refer to FIG. 7, which is divided into two sections 7A and 7B). If the address does not refer to an address of the area in the OS/2 EXE format, then the file is not designed in the OS/2 EXE format, an error message is output, and the difference extracting process terminates in step S523.

If the above described address refers to the address of the area in the OS/2 EXE format, then it is determined whether or not a 1-word value stored at the OS/2 EXE relative offset 36h in the OS/2 EXE header is 1 in the old EXE file 305 and the new EXE file 306 in step S504 (refer to FIG. 7, which is divided into two sections 7A and 7B). The OS/2 EXE relative offset refers to a relative offset from the leading address of the area in the OS/2 EXE format. If the value is not 1, then the file is not designed in the OS/2 EXE format, an error message is output, and the difference extracting process terminates in step S523.

If the value is 1, then the data area in the DOS EXE format is extracted as an area from the file offset 0 to the address represented as the contents of the file offset 3Ch in the DOS EXE header before the address of the area in the OS/2 EXE format in the old EXE file 305 and the new EXE file 306 in step S505 (refer to FIG. 4).

Then, the header analyzing unit 301 calls the difference extracting unit 304 and transmits to the difference extracting unit 304 the DOS EXE formatted data area extracted from the old EXE file 305 and the new EXE file 306 in step S506. As a result, the difference extracting unit 304 extracts the difference in byte units between the old EXE file 305 and the new EXE file 306 from beginning to end in the data areas in the DOS EXE format received from the header analyzing unit 301. The extracted difference is stored in the update file 307.

Then, data marked with ⊕ are extracted in step S507 from the contents of the OS/2 EXE header shown in FIG. 7, which is divided into two sections 7A and 7B, in the old EXE file 305 and the new EXE file 306. The extracted data are stored in respective variables shown in FIG. 8. The variables are defined in a memory not shown in the drawings, and are described later.

In step S508, the OS/2 EXE header area is extracted as an area from the address of the OS/2 EXE area represented by the contents of the file offset 3Ch in the DOS EXE formatted header to the address represented by the variable segtble-off (refer to FIG. 8) before the leading address of the segment table unit in the old EXE file 305 and the new EXE file 306 (refer to FIG. 4).

Then, the header analyzing unit 301 calls the difference extracting unit 304 and transmits to the difference extracting unit 304 the OS/2 EXE header area extracted from the old EXE file 305 and the new EXE file 306 in step S509. As a result, the difference extracting unit 304 extracts the difference in byte units between the old EXE file 305 and the new EXE file 306 from beginning to end in the OS/2 EXE header areas received from the header analyzing unit 301. The extracted difference is stored in the update file 307.

Figure 9:
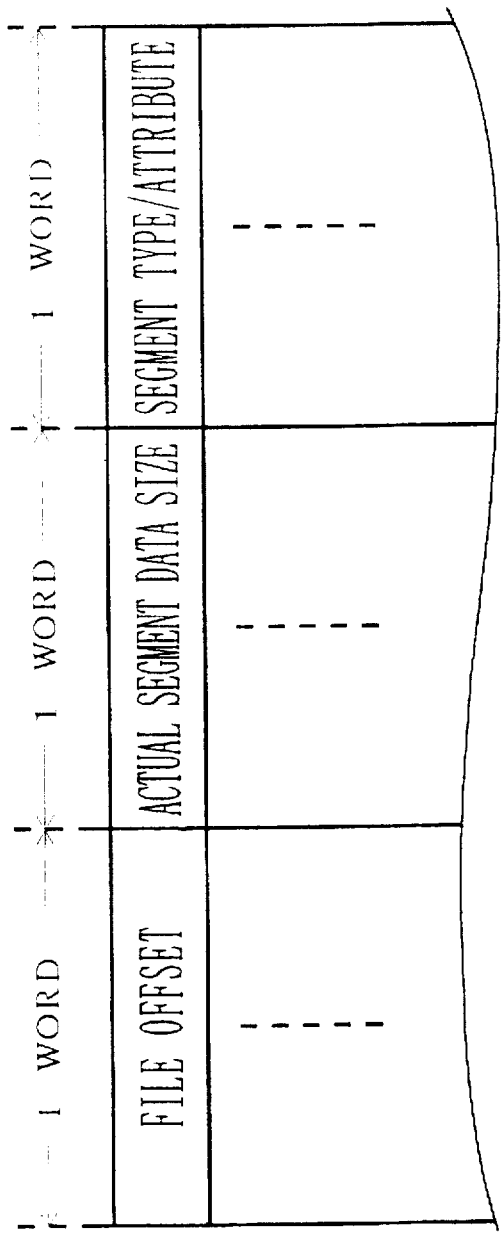
FIG. 9 shows the structure of the data on the segment table unit.

In step S510, analyzed is the segment table unit (refer to FIG. 4) extracted using the variable segtbl-off and segtbl-cnt (refer to FIG. 8) in the old EXE file 305 and the new EXE file 306. The data structure of the segment table unit is shown in FIG. 9. The segment table unit stores a data set corresponding to respective segment data described later. The data set comprises 1-word file offset data indicating the leading address of the segment data, 1-word actual segment data size data indicating the actual size of segment data, and 1-word segment type/attribute data indicating the type and attribute of segment data. In step S510, the data structure of the old EXE file 305 and the new EXE file 306 is set in the format of a data structure as segment information 308 (refer to FIG. 3) in the memory accessible from the segment data associating unit 302 and the resource associating unit 303 but not shown in the drawings.

In step S511, the area of the above described segment table unit (refer to FIG. 4) is extracted in the old EXE file 305 and the new EXE file 306. The area is extracted as an area from the offset address of the segment table unit represented by the variable segbl-off to the address before the offset address of the export entry table unit represented by the variable entrytbl-off (refer to FIGS. 4 and 8).

Then, the header analyzing unit 301 calls the difference extracting unit 304 in step S512, and transmits to the difference extracting unit 304 an area of the segment table unit extracted in the old EXE file 305 and the new EXE file 306. As a result, the difference extracting unit 304 extracts the difference in byte units between the old EXE file 305 and the new EXE file 306 from beginning to end in the areas of the segment table units received from the header analyzing unit 301. The extracted difference is stored in the update file 307.

In step S513, areas of the export entry table units are extracted in the old EXE file 305 and the new EXE file 306 (refer to FIG. 4). The area is extracted as an area from the offset address of the export entry table unit represented by the variable entrytbl-off to the address before the offset address of the resident name table unit represented by the variable resnamtbl-off (refer to FIGS. 4 and 8).

If an OS/2 EXE formatted program contains the export entry table unit, and the program can be, for example, a dynamic link library (DLL) program, that is, can be referred to by another OS/2 program, then the export entry table unit stores a segment number and an offset in the file to a function so that the other OS/2 program can refer to the function provided as a part of the program containing the table unit.

Then, the header analyzing unit 301 calls the difference extracting unit 304 in step S514, and transmits to the difference extracting unit 304 an area of the export entry table unit extracted in the old EXE file 305 and the new EXE file 306. As a result, the difference extracting unit 304 extracts the difference in byte units between the old EXE file 305 and the new EXE file 306 from beginning to end in the areas of the segment table units received from the header analyzing unit 301. The extracted difference is stored in the update file 307.

In step S515, areas of the resident name table units non-resident name table units (shown in FIG. 4) are extracted as an area in the old EXE file 305 and the new EXE file 306. The area is extracted as an area from the offset address of the resident name table unit represented by the variable resnamtbl-off to the address before the offset address of the module reference table unit represented by the variable modref-off (refer to FIGS. 4 and 8).

The resident name table unit and the non-resident name table unit have a common configuration shown in FIG. 10. The resident name table unit stores the name, the number of bytes, and the index of an entered table for a resident module in a memory during the execution of a program. The non-resident name table unit stores the name, the number of bytes, and the index of an entered table for a module called by a program being executed if necessary during the execution of the program.

Then, the header analyzing unit 301 calls the difference extracting unit 304 in step S516, and transmits to the difference extracting unit 304 an area of the resident/non-resident name table unit extracted in the old EXE file 305 and the new EXE file 306. As a result, the difference extracting unit 304 extracts the difference in byte units between the old EXE file 305 and the new EXE file 306 from beginning to end in the areas of the resident/non-resident name table units received from the header analyzing unit 301. The extracted difference is stored in the update file 307.

In step S517, areas of the module reference table unit and the import name table unit (refer to FIG. 4) are extracted as an area in the old EXE file 305 and the new EXE file 306 (refer to FIG. 4). The area is extracted as an area from the offset address of the module reference table unit represented by the variable modref-off to the address before the leading offset address of the resource table unit represented by the variable resrctbl-off (refer to FIGS. 4 and 8).

Figure 12:
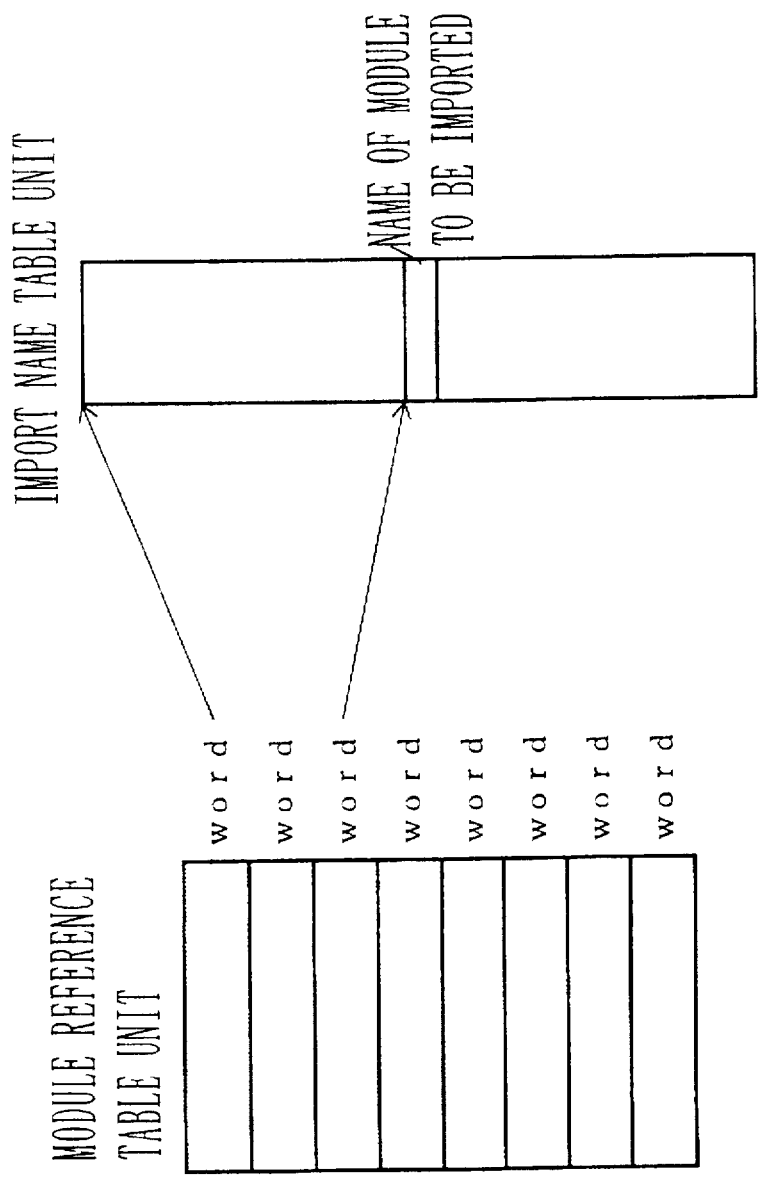
FIG. 12 shows the relationship between the module reference table unit and the import name table unit.

As shown in FIG. 11, the import name table unit stores the name and the number of bytes of the module for a DLL program referred to by a program containing the import name table unit. The module reference table unit stores as a word array an offset value to each element of the import name table unit as shown in FIG. 12.

Then, the header analyzing unit 301 calls the difference extracting unit 304 in step S518, and transmits to the difference extracting unit 304 an area of the module reference/import name table unit extracted in the old EXE file 305 and the new EXE file 306. As a result, the difference extracting unit 304 extracts the difference in byte units between the old EXE file 305 and the new EXE file 306 from beginning to end in the areas of the module reference/import name table units received from the header analyzing unit 301. The extracted difference is stored in the update file 307.

In step S519, analyzed is the resource table unit (refer to FIG. 4) extracted using the variable resrctbl-off and resrctbl-cnt (refer to FIG. 8) in the old EXE file 305 and the new EXE file 306. The data structure of the resource table unit is shown in FIG. 13. The resource table unit stores a data set corresponding to respective resources described later. The data set comprises 1-word resource type ID data indicating the identifier of a resource type and 1-word resource name ID data indicating the identifier of a resource name. In step S519, the data structure of the old EXE file 305 and the new EXE file 306 is set as resource information 309 (refer to FIG. 3) in the memory accessible from the resource associating unit 303 but not shown in the drawings.

In step S520, the area of the above described resource table unit (refer to FIG. 4) is extracted in the old EXE file 305 and the new EXE file 306. The area is extracted as an area from the offset address of the resource table unit represented by the variable resrctbl-off to the address represented by the variable resrctbl-cnt indicating the number of the resource entry (refer to FIGS. 4 and 8).

Then, the header analyzing unit 301 calls the difference extracting unit 304 in step S521, and transmits to the difference extracting unit 304 an area of the resource table unit extracted in the old EXE file 305 and the new EXE file 306. As a result, the difference extracting unit 304 extracts the difference in byte units between the old EXE file 305 and the new EXE file 306 from beginning to end in the areas of the resource table units received from the header analyzing unit 301. The extracted difference is stored in the update file 307.

Thus, the header analyzing unit 301 performs the difference extracting process on the old EXE file 305 and the new EXE file 306 for each of the DOS EXE format areas, OS/2 EXE header areas, and table unit areas.

Then, the header analyzing unit 301 activates the segment data associating unit 302 shown in FIG. 3 in step S522, and terminates the process.

Figure 14:
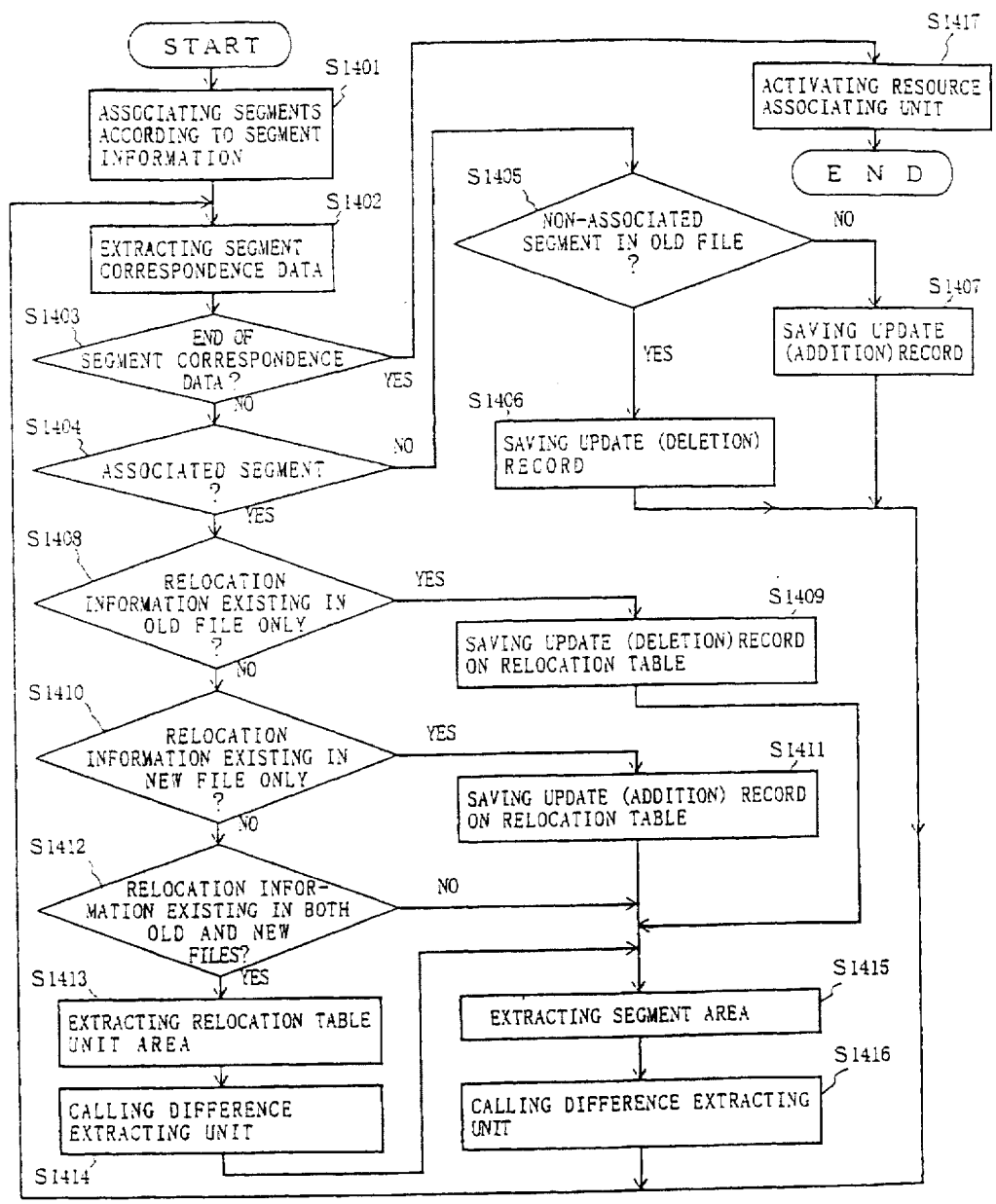
FIG. 14 is a flowchart of the operation of the segment data associating unit.

FIG. 14 shows the flowchart of the operation performed by the segment data associating unit 302. The operation of the segment data associating unit 302 is performed on the old EXE file 305 and the new EXE file 306 stored in, for example, a disk device by the CPU as a part of the operation to execute a control program stored in a memory.

If there are segment data corresponding between the old EXE file 305 and the new EXE file 306, then data in unchanged segments match those in the corresponding segments, and differences are detected only for the segments in which data have been changed. Therefore, the segment data associating unit 302 compares and associates between the old EXE file 305 and the new EXE file 306 the attribute and the data in an important portion of segment data. Then, the segment data associating unit 302 instructs the difference extracting unit 304 to perform the difference extracting process on each of the associated segment data areas.

First, in step S1401, segments are associated with each other according to the segment information 308 set by the header analyzing unit 301 in step S510 shown in FIG. 6.

In this process, segments in the old EXE file 305 are arranged in a line according to the segment information 308 (refer to FIG. 9) in the old EXE file 305. The segments are arranged with the file offset increased through a linker. FIG. 15A shows an example of a segment of the old EXE file 305.

Then, the segments of the new EXE file 306 are arranged in a line according to the segment information 308 (refer to FIG. 9) of the new EXE file 306. FIG. 15B shows an example of the segments of the new EXE file 306.

In the examples shown in FIGS. 15A and 15B, the new EXE file 306 contains data added to the old EXE file 305. Therefore, the addition should be detected.

Figure 16A:
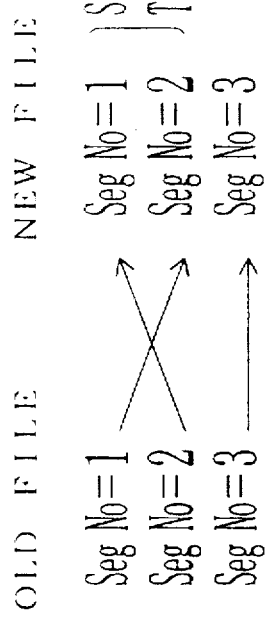
FIGS. 16A and 16B show the correspondence among segments.
Figure 16B:
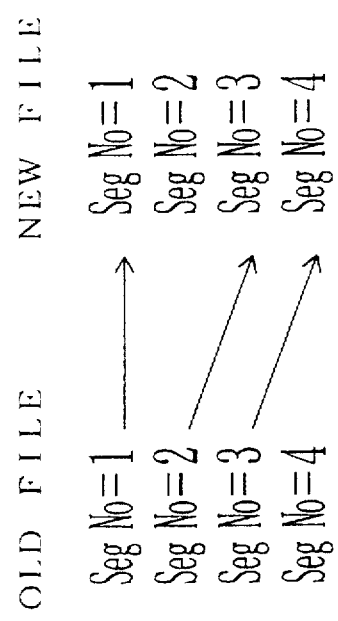

According to the present embodiment, the update from the old EXE file 305 to the new EXE file 306 is performed by the deletion, replacement, or addition of a segment. Therefore, the correspondence of segments between the old EXE file 305 and the new EXE file 306 cannot be what is shown in FIG. 16A, but can be what is shown in FIG. 16B. In this example, the segment No. 4 in the old EXE file 305 is deleted; the segment No.2 of the new EXE file 306 is added; and the other segments remain unchanged or replaced.

Then, the arranged segments of the old EXE file 305 and the new EXE file 306 are associated with each other as follows.

Process 1: The number of segments are compared between the old EXE file 305 and the new EXE file 306.

Process 2: If the number of segments in the old EXE file 305 is equal to or smaller than that in the new EXE file 306, the segments in the new EXE file 306 are searched using as a key the segments defined in the old EXE file 305. If the number of segments in the old EXE file 305 is larger, then the segments in the old EXE file 305 are searched using as a key the segments defined in the new EXE file 306.

Figure 17:
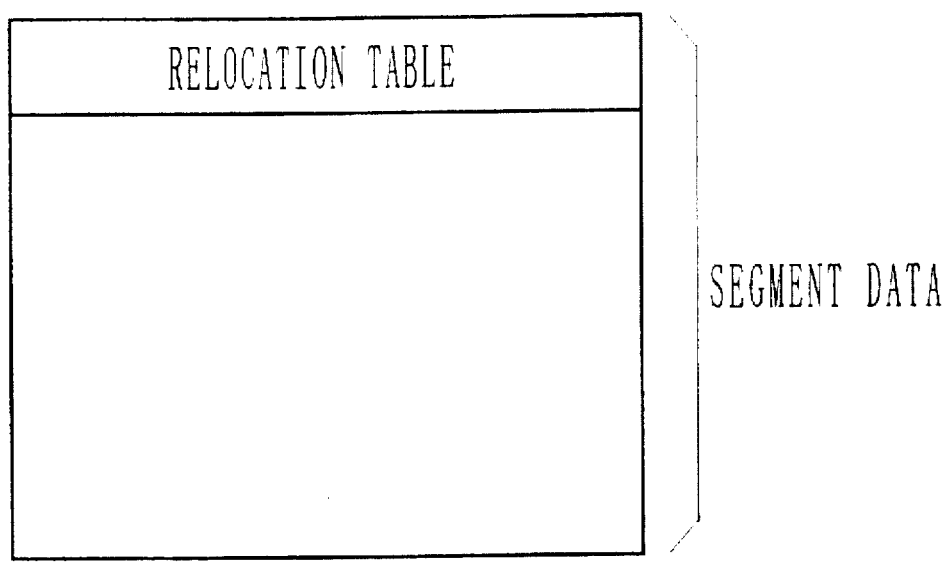
FIG. 17 shows the relocation information.

Process 3: A search object segment is associated with a present key segment as a corresponding segment if these segments have the same segment type, attribute, and contents in the first 16-byte segment data. FIG. 17 shows segment data containing a relocation table which starts with relocation information. If the key segment or the search object segment refers to such segment data, then the segment which contains the first 16 bytes of the relocation table is associated with the present key segment, and the difference extracting process is performed on the relocation table as described later. Whether or not the relocation table is contained is determined by checking for the data value indicating the existence of the relocation table in the segment type/attribute data of the segment information 308.

If no corresponding segment is detected in the search object segments, the search is abandoned for the key segment, and the segment is defined as a non-associated segment in the old EXE file 305, and the next key segment is searched for in the new EXE file 306.

If the search has been completed, the segments in the new EXE file 306 not associated with the key segments are defined as non-associated segments in the new EXE file 306.

Thus, the associated segments, non-associated segments in the old EXE file 305, and the non-associated segments in the new EXE file 306 are stored in, for example, a memory as segment correspondence data.

As described above, if the search has been completed in step S1401 shown in FIG. 14, the processes in steps S1402 through S1416 are repeatedly performed on each piece of segment correspondence data.

That is, a piece of segment correspondence data is extracted from, for example, a memory in step S1402.

The determination in step S1403 indicates "Yes" if segment correspondence data exist. Then, it is determined whether or not the segment correspondence data refer to an associated segment in step S1404.

If the segment correspondence data refer to an associated segment and the determination in step S1404 indicates "Yes", then it is determined whether or not the relocation information is set in both or either of the old EXE file 305 and the new EXE file 306 in steps S1408, S1410, and S1412.

If the relocation information is set in both old EXE file 305 and new EXE file 306, then the determinations in steps S1408 and S1410 indicate "No", the determination in step S1412 indicates "Yes", and the process in step S1413 is performed. In step S1413, the relocation table unit areas are extracted from the old EXE file 305 and the new EXE file 306. The areas are extracted as those starting at the leading address of segment data and ending at the address of the number of relocation items set in the leading byte forward the leading address. In step S1414, the segment data associating unit 302 calls the difference extracting unit 304, and transmits to the difference extracting unit 304 an area of the relocation table unit extracted in the old EXE file 305 and the new EXE file 306. As a result, the difference extracting unit 304 extracts the difference in byte units between the old EXE file 305 and the new EXE file 306 from beginning to end in the areas of the relocation table units received from the segment data associating unit 302. The extracted difference is stored in the update file 307.

If relocation information is set in the old EXE file 305 only, then the determination in step S1408 indicates "Yes" and the process in step S1409 is performed. In step S1409, difference information (update record) about the deletion of the area of the resource table unit in the old EXE file 305 is stored in the update file 307.

If relocation information is set in the new EXE file 306 only, then the determination in step S1408 indicates "No", the determination in step S1410 indicates "Yes", and the process in step S1411 is performed. In step S1411, difference information (update record) about the addition of the area of the resource table unit in the new EXE file 306 is stored in the update file 307.

If no relocation information is set in the old EXE file 305 or the new EXE file 306, then the above described process related to the relocation table is not performed.

After the processes in the steps S1414, S1409, and S1411 have been completed or after the determination in step S1412 indicates "No", the process in step S1415 is carried out. In step S1415, extracted is the area of the body of the segment data excluding the relocation information. This area starts at the leading address of segment data if no relocation information is set, and starts at the address after the number of relocation items set in the leading byte of the segment data if the relocation information is set. It ends at the address before the offset address of the segment data to be extracted after the present segment from the segment information 308.

In step S1416, the segment data associating unit 302 calls the difference extracting unit 304, and transmits to the difference extracting unit 304 an area of the segment data extracted in the old EXE file 305 and the new EXE file 306. As a result, the difference extracting unit 304 extracts the difference in byte units between the old EXE file 305 and the new EXE file 306 from beginning to end in the areas of the segment data received from the segment data associating unit 302. The extracted difference is stored in the update file 307.

If the segment correspondence data do not refer to an associated segment and the determination is "No" in step S1404, it is further determined whether or not the segment correspondence data refer to a non-associated segment in the old EXE file 305 in step S1405.

If the segment correspondence data refer to a non-associated segment of the old EXE file 305 and the determination in step S1405 is "Yes", then the process in step S1406 is carried out. In step S1406, the difference information (update record) about the deletion of the area of the non-associated segment in the old EXE file 305 is stored in the update file 307.

If the segment correspondence data do not refer to a non-associated segment of the old EXE file 305 and the determination in step S1405 is "No", then it refers to a non-associated segment of the new EXE file 306 and the process in step S1407 is carried out. In step S1407, the difference information (update record) about the addition of the area of the non-associated segment in the new EXE file 306 is stored in the update file 307.

The processes in step S1402 through S1416 are repeatedly performed on all segment correspondence data. If all the segment correspondence data have been processed, the determination in step S1403 indicates "No". Thus, the segment data associating unit 302 associate data between the old EXE file 305 and the new EXE file 306, and the difference extracting unit 304 performs the difference extracting process on each area of the associated segment data.

In step S1417, the segment data associating unit 302 activates the resource associating unit 303 shown in FIG. 3, and the process terminates.

Figure 18:
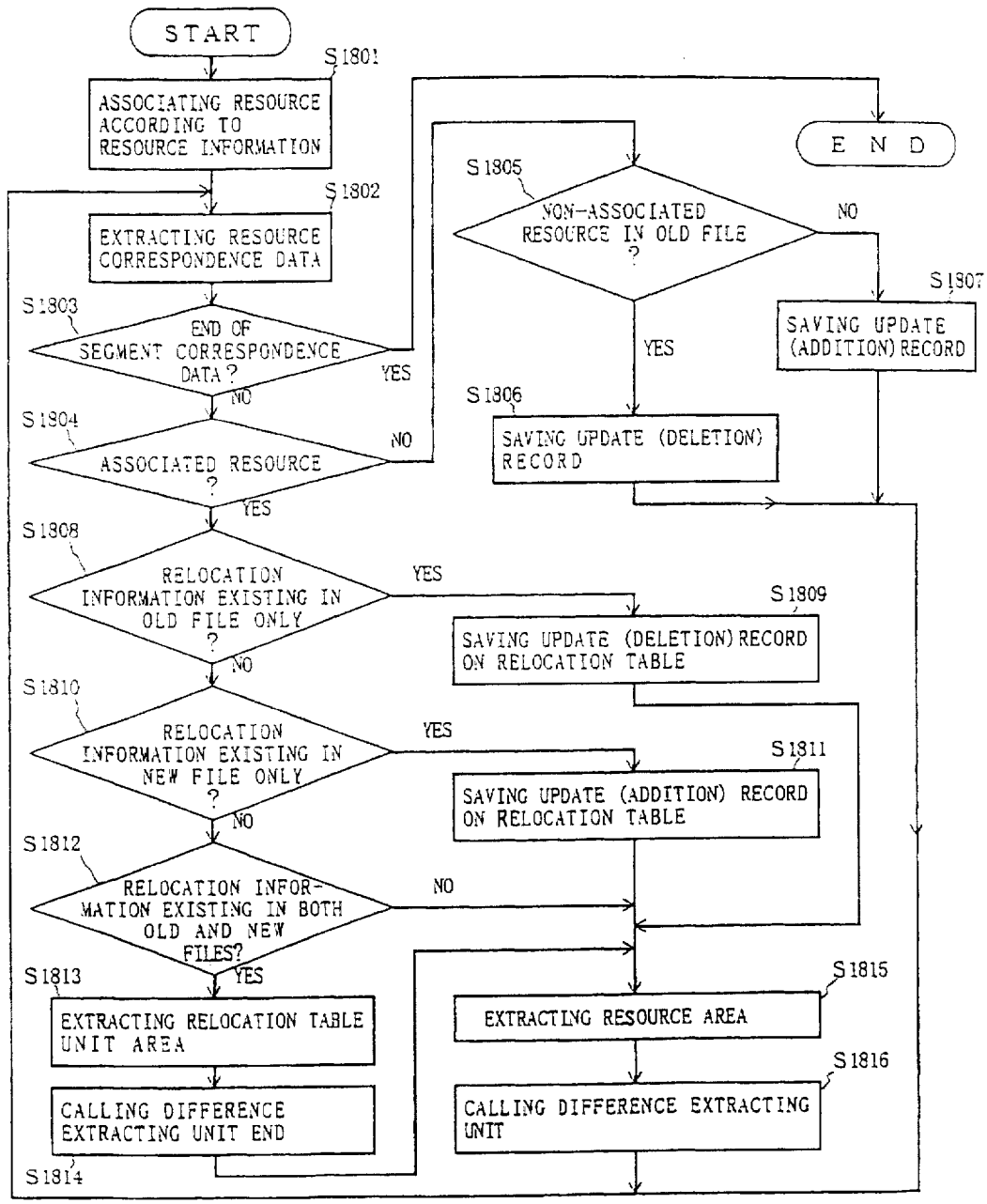
FIG. 18 is a flowchart of the operation of the resource associating unit.

FIG. 18 shows a flowchart of the operation performed by the resource associating unit 303. As in the header analyzing unit 301, the operation of the resource associating unit 303 is realized as a part of the operations performed on the old EXE file 305 and the new EXE file 306 stored in, for example, a disk device by the central processing unit (CPU) for executing a control program stored in a memory in a computer system not shown in the drawings.

The resources are defined as an attribute of segment data. As in the above described segment data, if the old EXE file 305 and the new EXE file 306 share the corresponding resources, non-changed resources match each other and changed resources generates difference information. Thus, the resource associating unit 303 as well as the segment data associating unit 302 associates the resources between the old EXE file 305 and the new EXE file 306 and instructs the difference extracting unit 304 to perform the difference extracting process on each area of the associated resources.

The resources are especially assigned resource name IDs as shown on the above described resource table unit (refer to FIG. 13). The resource associating unit 303 compares and associates the resource names between the old EXE file 305 and the new EXE file 306. It instructs the difference extracting unit 304 to perform the difference extracting process on each area of the associated resources.

In step S1801, resources are associated with each other according to the segment information 308 and resource information 309 set by the header analyzing unit 301 in steps S510 and S519 shown in FIG. 6.

In these processes, the resources are extracted according to the segment information 308 of the old EXE file 305 and the new EXE file 306 (shown in FIG. 9) and the resource information 309. The segment information 308 after {(number of segments defined as segment information 308) −(number of resources defined as resource information 309)+1}th segment information 308 refers to the resources corresponding to the resource name IDs. FIG. 19A shows an example of the resources extracted in the old EXE file 305 and the new EXE file 306.

Then, the resources extracted from the old EXE file 305 and the new EXE file 306 are sorted in the order of the offset of the file extracted from the segment information 308. FIG. 19B shows examples of the sorted resources of the old EXE file 305 and the new EXE file 306.

Figure 20:
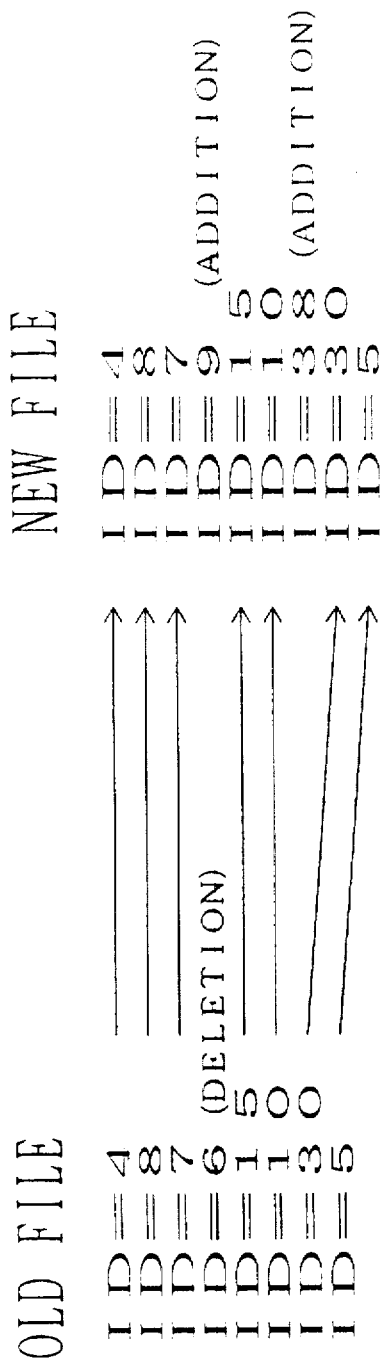
FIG. 20 shows the correspondence of the resources.

The sorted resources having the same resource name ID are associated with each other between the old EXE file 305 and the new EXE file 306. As a result, the correspondences among the examples shown in FIGS. 19A and 19B are shown in FIG. 20. In these examples, the resource having the resource name ID=6 of the old EXE file 305 is deleted, the resources having the resource names ID=9 and ID=38 are added, and the other associated resources remain unchanged or replaced.

The sorted resources of the old EXE file 305 and the new EXE file 306 are processed in the following steps.

Process 1: The number of resources are compared between the old EXE file 305 and the new EXE file 306.

Process 2: If the number of resources in the old EXE file 305 is equal to or smaller than that in the new EXE file 306, the resources in the new EXE file 306 are searched using as a key the resources defined in the old EXE file 305. If the number of resources in the old EXE file 305 is larger, then the resources in the old EXE file 305 are searched using as a key the resources defined in the new EXE file 306.

Process 3: A search object resource is associated with a present key resource as a corresponding resource if these resources have the same resource name. As in the above described segment data, FIG. 17 shows resource data containing a relocation table which starts with relocation information. If the key resource or the search object resource refers to such resource data, then the resource which contains the first 16 bytes of the relocation table is associated with the present key resource, and the difference extracting process is performed on the relocation table as described later. Whether or not the relocation table is contained is determined by checking for the data value indicating the existence of the relocation table in the segment type/attribute data of the segment information 308 corresponding to a resource.

If no corresponding resource is detected in the search object resources, the search is abandoned for the key resource, and the resource is defined as a non-associated resource in the old EXE file 305, and the next key resource is searched for in the new EXE file 306.

If the search has been completed, the resources in the new EXE file 306 not associated with the key resources are defined as non-associated resources in the new EXE file 306.

Thus, the associated resources, non-associated resources in the old EXE file 305, and the non-associated resources in the new EXE file 306 are stored in, for example, a memory as resource correspondence data.

As described above, if the search has been completed in step S1801 shown in FIG. 18, the processes in steps S1802 through S1816 are repeatedly performed on each piece of resource correspondence data. These processes are the same as those performed on segment correspondence data in step S1402 through S1416 shown in FIG. 14.

That is, a piece of resource correspondence data is extracted from, for example, a memory in step S1802.

The determination in step S1803 indicates "Yes" if resource correspondence data exist. Then, it is determined whether or not the resource correspondence data refer to an associated resource in step S1804.

If the resource correspondence data refer to an associated resource and the determination in step S1804 indicates "Yes", then it is determined whether or not the relocation information is set in both or either of the old EXE file 305 and the new EXE file 306 in steps S1808, S1810, and S1812.

If the relocation information is set in both old EXE file 305 and new EXE file 306, then the determinations in steps S1808 and S1810 indicate "No", the determination in step S1812 indicates "Yes", and the process in step S1813 is performed. In step S1813, the relocation table unit areas are extracted from the old EXE file 305 and the new EXE file 306. The areas are extracted as those starting at the leading address of resource data and ending at the address of the number of relocation items set in the leading byte forward the leading address. In step S1814, the resource associating unit 303 calls the difference extracting unit 304, and transmits to the difference extracting unit 304 an area of the relocation table unit extracted in the old EXE file 305 and the new EXE file 306. As a result, the difference extracting unit 304 extracts the difference in byte units between the old EXE file 305 and the new EXE file 306 from beginning to end in the areas of the relocation table units received from the resource associating unit 303. The extracted difference is stored in the update file 307.

If relocation information is set in the old EXE file 305 only, then the determination in step S1808 indicates "Yes" and the process in step S1809 is performed. In step S1809, difference information (update record) about the deletion of the area of the resource table unit in the old EXE file 305 is stored in the update file 307.

If relocation information is set in the new EXE file 306 only, then the determination in step S1808 indicates "No", the determination in step S1810 indicates "Yes", and the process in step S1811 is performed. In step S1811, difference information (update record) about the addition of the area of the resource table unit in the new EXE file 306 is stored in the update file 307.

If no relocation information is set in the old EXE file 305 or the new EXE file 306, then the above described process related to the relocation table is not performed.

After the processes in the steps S1814, S1809, and S1811 have been completed or after the determination in step S1812 indicates "No", the process in step S1815 is carried out. In step S1815, extracted is the area of the body of the resource data excluding the relocation information. This area starts at the leading address of resource data if no relocation information is set, and starts at the address after the number of relocation items set in the leading byte of the resource data if the relocation information is set. It ends at the address before the offset address of the resource data to be extracted after the present resource from the segment information 308 and the resource information 309.

In step S1816, the resource associating unit 303 calls the difference extracting unit 304, and transmits to the difference extracting unit 304 an area of the resource data extracted in the old EXE file 305 and the new EXE file 306. As a result, the difference extracting unit 304 extracts the difference in byte units between the old EXE file 305 and the new EXE file 306 from beginning to end in the areas of the resource data received from the resource associating unit 303. The extracted difference is stored in the update file 307.

If the resource correspondence data do not refer to an associated resource and the determination is "No" in step S1804, it is further determined whether or not the resource correspondence data refer to a non-associated resource in the old EXE file 305 in step S1805.

If the resource correspondence data refer to a non-associated resource of the old EXE file 305 and the determination in step S1805 is "Yes", then the process in step S1806 is carried out. In step S1806, the difference information (update record) about the deletion of the area of the non-associated resource in the old EXE file 305 is stored in the update file 307.

If the resource correspondence data do not refer to a non-associated resource of the old EXE file 305 and the determination in step S1805 is "No", then it refers to a non-associated resource of the new EXE file 306 and the process in step S1807 is carried out. In step S1807, the difference information (update record) about the addition of the area of the non-associated resource in the new EXE file 306 is stored in the update file 307.

The processes in step S1802 through S1816 are repeatedly performed on all resource correspondence data. If all the resource correspondence data have been processed, then the determination in step S1803 indicates "No" and the processes are completed.

Finally, described below is the process of the difference extracting unit 304 which is called by the header analyzing unit 301, the segment data associating unit 302, and the resource associating unit 303 as described above.

Figure 21:
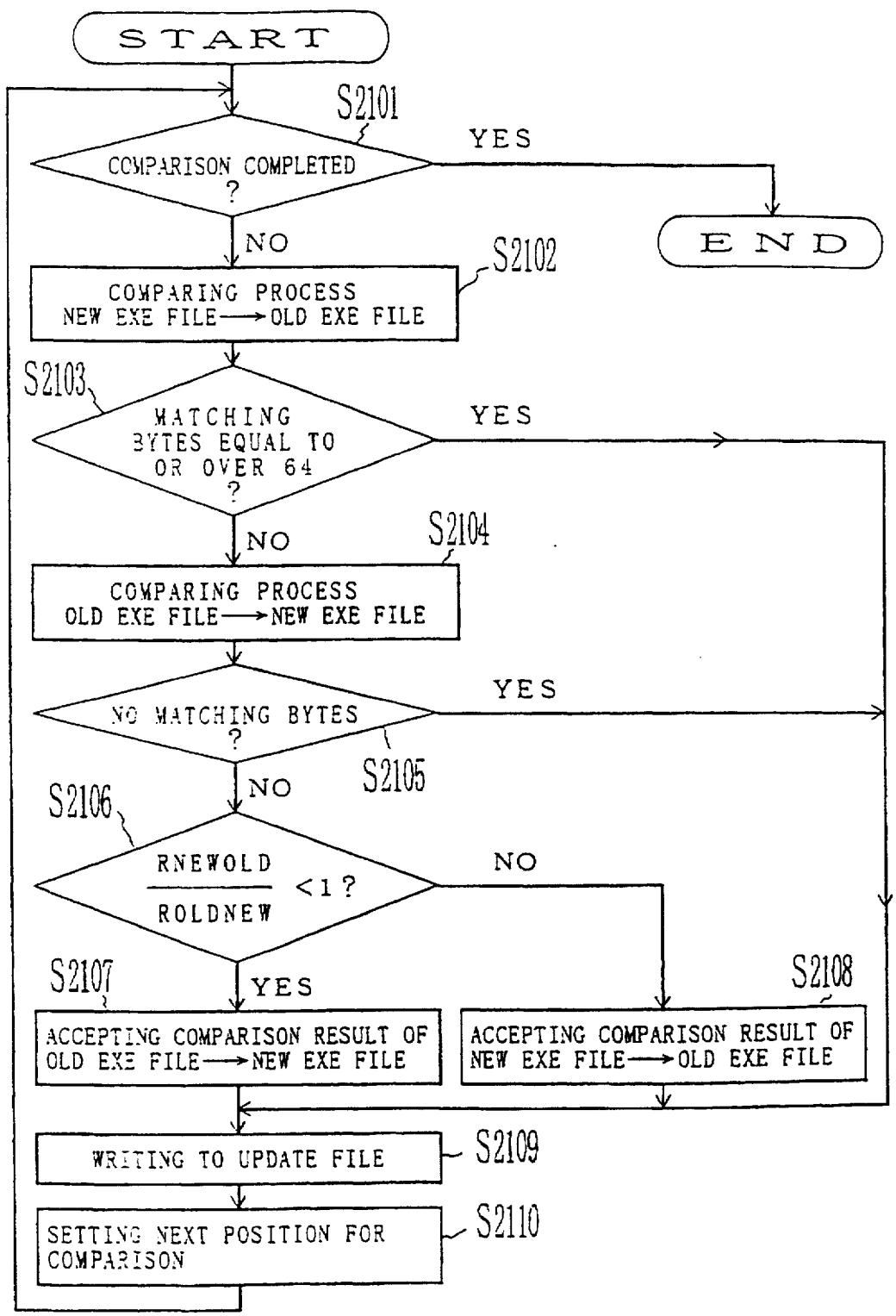
FIG. 21 is a flowchart of the operation of the difference extracting process.
Figure 22:
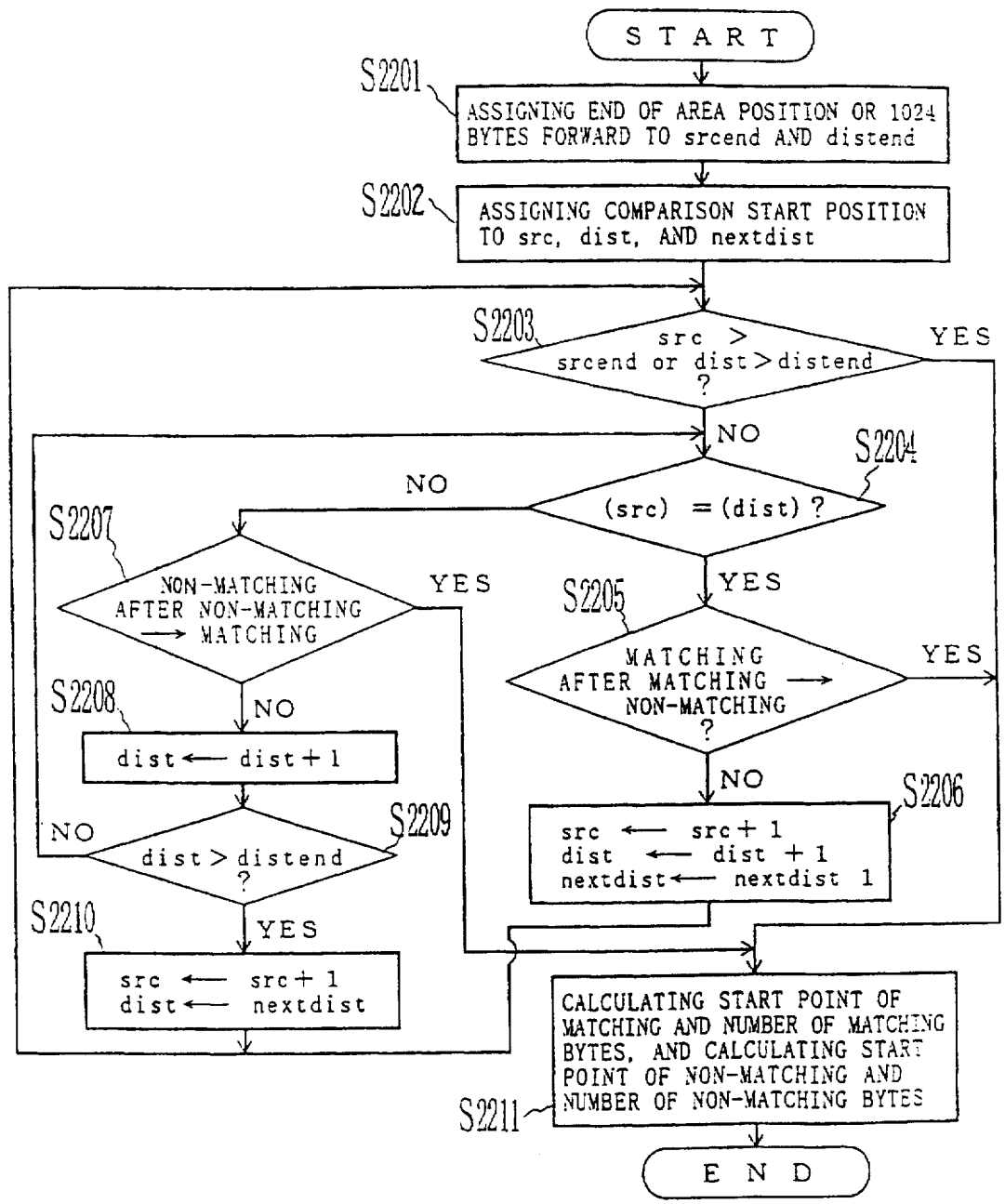
FIG. 22 is a flowchart of the operation of the comparing process.

FIG. 21 is a flowchart showing the difference extracting process performed by the difference extracting unit 304. FIG. 22 shows a flowchart of the comparing process executed in the difference extracting process. As in the header analyzing unit 301, these processes are realized as a part of the operations performed on the old EXE file 305 and the new EXE file 306 stored in, for example, a disk device by the central processing unit (CPU) for executing a control program stored in a memory in a computer system not shown in the drawings.

Figure 24A:
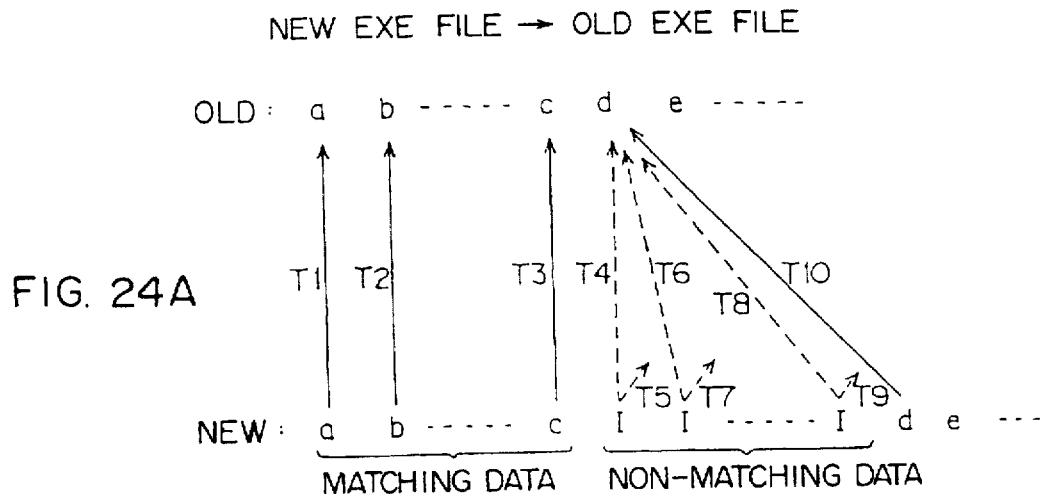
FIGS. 24A and 24B show the difference extracting process performed when a new EXE file indicates the addition of data.

Assume that, as shown in FIG. 24A, specified are an area comprising the byte data string ab ... cde ... as the area of the old EXE file 305, and an area comprising the byte data string II ... I embedded between the byte data c and d.

In FIG. 21, it is determined whether or not there are data to be compared still remaining in the specified areas in step S2101.

Figure 23:
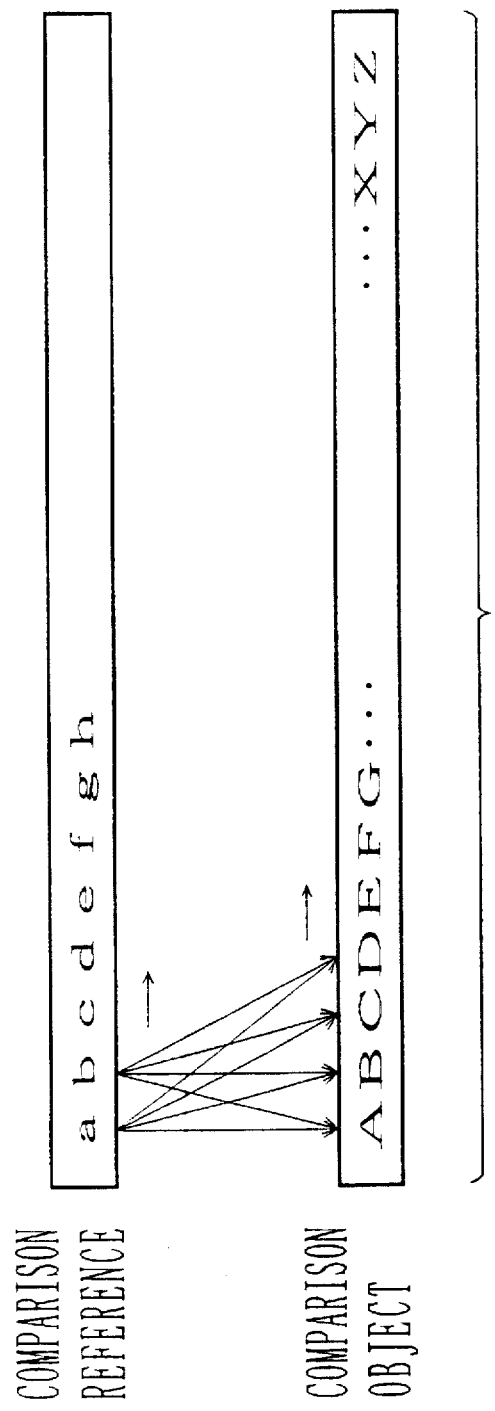
FIG. 23 shows the comparing process.

If yes, a comparing process is performed as shown in FIG. 23 with the specified area in the new EXE file 306 set as reference data and the specified area in the old EXE file 305 set as a comparison object in step S2102. The data in the comparison reference bytes are used as a key in the comparing process.

FIG. 22 is a flowchart showing the comparing process.

In step S2201 shown in FIG. 22, the address of the end of the comparison reference area or the address 1024 forward the start of the present comparison whichever is closer to the start of the present comparison reference data is stored in the variable srcend reserved in the memory not shown in the drawings. Likewise, the address of the end of the comparison object area or the address 1024 forward the start of the present comparison whichever is closer to the start of the present comparison object data is stored in the variable distend reserved in the memory not shown in the drawings.

In step S2202, the address of the start of the present comparison is stored in the variable src reserved in the memory not shown in the drawings. In the example shown in FIG. 24A, the variable src initially stores the address of the leading byte data a in the area specified in the new EXE file 306. Likewise, the address of the start of the present comparison object is stored in the variables dist and nextdist reserved in the memory not shown in the drawings. In the example shown in FIG. 24A, the variable dist nextdist initially stores the address of the leading byte data a in the area specified in the old EXE file 305.

Then, as shown in FIG. 24A, the processes in steps S2203, S2204, S2205, S2206, and S2203 are repeatedly performed with the variables src, dist, and nextdist sequentially incremented in step S2206 in the area of the matching byte data ab . . . c between the old EXE file 305 and the new EXE file 306. Thus, as shown by T1 through T3 in FIG. 24A, the byte data are sequentially associated if the values of the addresses stored in the variables src and dist match each other.

As shown in FIG. 24A, the variable src stores the address of the first data in the input data II . . . I in the new EXE file 306 as a comparison reference, and the variable dist stores the address of the data d in the old EXE file 305 as a comparison object in step S2206. Then, the determination indicates "No" when the process in step S2204 is performed.

Afterwards, the processes in steps S2203, S2207, S2208, S2209, S2204, S2207, and S2208 are repeatedly performed with the variable dist incremented in step S2208. The first byte data I entered in the new EXE file 306 at the address indicated by the variable src is used as a key, and is compared with each value of the byte data de . . . in the old EXE file 305 at the address indicated by the sequentially incremented variable dist. The comparison continues until a matching result is obtained and the determination in step S2204 outputs "Yes". FIG. 24A shows the operation by T4 and T5.

If the first byte data embedded in the new EXE file 306 does not match any byte data I in the old EXE file 305 after repeating the comparing process, then the address indicated by the variable dist exceeds the end-of-comparison address indicated by the variable distend, and the determination in step S2209 is "Yes".

In this case, the search using the key, that is, the first byte data I embedded in the new EXE file 306, is abandoned. Then, the value of the variable src is incremented, the second byte data I embedded in the new EXE file 306 is set as a key, and the variable dist stores the address indicated by the variable nextdist in step S2210. Thus, the start-of-comparison position in the old EXE file 305, which is a comparison object, is returned to the address of the byte data d where the first non-matching has arisen.

If the address indicated by the variable src does not exceed the end-of-comparison address indicated by the variable srcend and the determination in step S2203 is "No", then again the processes in steps S2203, S2207, S2208, S2209, S2204, S2207, and S2208 are repeatedly performed with the variable dist incremented in step S2208. The first byte data entered in the new EXE file 306 at the address indicated by the variable src is used as a key, and is compared with each value of the byte data de . . . in the old EXE file 305 at the address indicated by the sequentially incremented variable dist. The comparison continues until a matching result is obtained and the determination in step S2204 outputs "Yes". FIG. 24A shows the operation by T4 and T5.

Then, a similar comparing process is repeatedly performed on each byte data I for the third and subsequent bytes embedded in the new EXE file 306 each time the determination in step S2209 is "Yes" (T8 and T9 in FIG. 24A).

In step S2210, the address of the byte data d in the new EXE file 306 is assigned to the variable src and the address of the byte data d in the old EXE file 305 represented by the variable nextdist is assigned to the variable dist. When the process in step S2204 is performed, the byte data d in the new EXE file 306 at the address indicated by the variable src matches the byte data d in the old EXE file 305 at the address indicated by the variable dist. Then, the determination indicates "Yes". The matching state refers to the state reached when a matching state is reached after a non-matching result is output from the comparison between the bytes data II . . . I embedded in the new EXE file 306 and the byte data de . . . in the old EXE file 305 initially after the byte data ab . . . c match between the old EXE file 305 and the new EXE file 306. Thus, the determination in step S2205 indicates "Yes".

As a result, in step S2211, calculated are the start of the matching data (address of the byte data a) and the number of matching bytes between the old EXE file 305 and the new EXE file 306. Calculated then are the start of the non-matching data and the number of non-matching bytes II . . . I embedded in the new EXE file 306. Thus, the comparing process terminates.

As described above, calculated are the start points of matching and non-matching data and the numbers of the matching and non-matching bytes at the point where the associated matching data and the associated non-matching data are detected and the determination in step S2205 indicates "Yes", and at the point where the associated non-matching data and the associated matching data are detected and the determination in step S2207 indicates "Yes".

As a result of the above described processes, if associated matching data and non-associated matching data are detected in the comparing process in step S2102 shown in FIG. 21 performed on each byte data in a specified area in the old EXE file 305 with each byte data in a specified area in the new EXE file 306 defined as a key, then it is determined in step S2103 whether or not the number of the matching bytes exceeds 64 bytes.

If the number of matching bytes exceeds 64 bytes and the determination in step S2103 indicates "Yes", then the difference information about the above described non-matching data is written to the update file 307 in FIG. 3 in step S2109. For example, if the number of matching bytes in the byte data ab . . . c in the old EXE file 305 and the new EXE file 306 shown in FIG. 24A exceeds 64, then written to the update file 307 is the difference information that the byte data II . . . I are added in the new EXE file 306 as an addition to the data in the old EXE file 305 immediately after the address represented by the byte data c in the old EXE file 305.

If the number of the matching bytes is smaller than 64 and the determination in step S3203 indicates "No", then in reverse to the process in step S 2102, a comparing process is performed in step S2104 as shown in FIG. 22 with the specified area in the old EXE file 305 set as reference data and the specified area in the new EXE file 306 set as a comparison object. The data in the comparison reference bytes are used as a key in the comparing process.

Figure 24B:
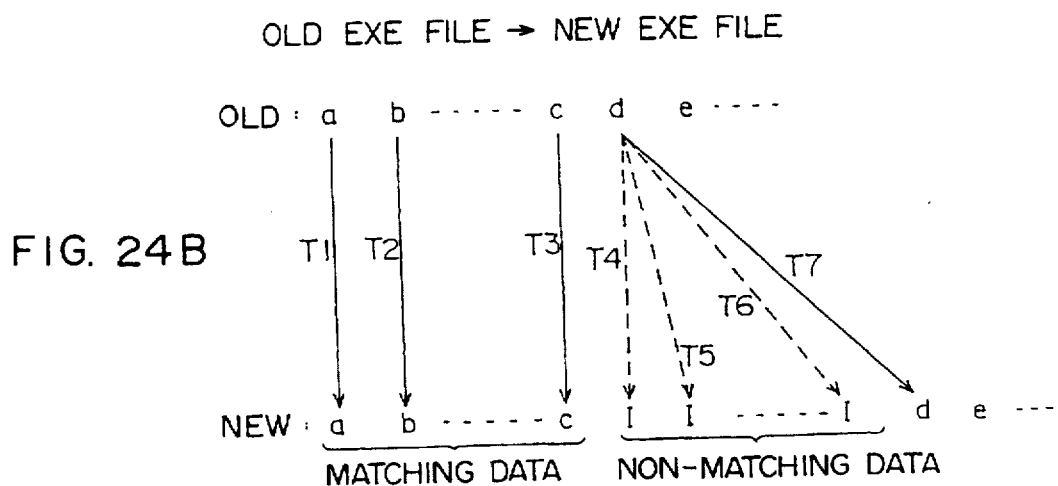

FIG. 24B shows the operation corresponding to that shown in FIG. 24A as an example of the comparing process.

First, in steps S2201 and S2202, the values similar to those shown in FIG. 24A are set to the variables srcend, distend, src, dist, and nextdist.

Then, the above described processes in steps S2203, S2204, S2205, S2206, and S2203 are repeatedly performed with the variables src, dist, and nextdist sequentially incremented in step S2206 in the area of the matching byte data ab . . . c between the old EXE file 305 and the new EXE file 306. Thus, as shown by T1 through T3 in FIG. 24B, the byte data are sequentially associated if the values of the addresses stored in the variables src and dist match each other.

As shown in FIG. 24B, the variable src stores the address of d in the old EXE file 305 as a comparison reference, and the variable dist stores the address of the first data in the added byte data II . . . I in the new EXE file 306 as a comparison object in step S2206. Then, the determination indicates "No" when the process in step S2204 is performed.

Afterwards, the processes in steps S2203, S2207, S2208, S2209, S2204, S2207, and S2208 are repeatedly performed with the variable dist incremented in step S2208. The byte data d entered in the old EXE file 305 at the address indicated by the variable src is used as a key, and is compared with each value of the byte data II . . . I in the new EXE file 306 at the address indicated by the sequentially incremented variable dist. The comparison continues until a matching result is obtained and the determination in step S2204 outputs "Yes". FIG. 24B shows the operation by T4 through T6.

In step S2208, after repeating the comparing process, the address of the byte data d in the new EXE file 306 is assigned to the variable dist and the address of the byte data d in the old EXE file 305 represented by the variable nextdist is assigned to the variable dist. When the process in step S2204 is performed, the byte data d in the old EXE file 305 at the address indicated by the variable src matches the byte data d in the old EXE file 305 at the address indicated by the variable dist. Then, the determination indicates "Yes". The matching state refers to the state reached when a matching state is reached after a non-matching result is output from the comparison between the bytes data II . . . I embedded in the new EXE file 306 and the byte data d in the old EXE file 305 initially after the byte data ab . . . c match between the old EXE file 305 and the new EXE file 306. Thus, the determination in step S2205 indicates "Yes".

As a result, in step S2211, calculated are the start of the matching data (address of the byte data a) and the number of matching bytes between the old EXE file 305 and the new EXE file 306 shown in FIG. 24B. Calculated then are the start of the non-matching data and the number of non-matching bytes II . . . I embedded in the new EXE file 306. Thus, the comparing process terminates.

If, as a result of the above described processes, associated matching data and non-associated matching data are detected in the comparing process in step S2104 shown in FIG. 21 performed on each byte data in a specified area in the new EXE file 306 with each byte data in a specified area in the old EXE file 305 defined as a key, then it is determined in step S2105 whether or not no bytes match with each other.

If no bytes match with each other and the determination in step S2105 indicates "Yes", then the difference information about the above described non-matching data is written to the update file 307 in FIG. 3 in step S2109.

If, as shown in the examples in FIGS. 24A and 24B, all bytes do not match and the determination in step S2105 indicates "No", calculated then is the rate RNEWOLD of matching bytes obtained in the comparing process in step S2102 based on the following equation with the byte data in the new EXE file 306 defined as a key in step S2106.

$$RNEWOLD = (\text{number of matching bytes between new and old files}) / \{(\text{number of matching bytes between new and old files}) + (\text{number of non-matching bytes between new and old files})\} \quad (1)$$

Then, according to the following equation, calculated is the rate ROLDNEW of matching bytes obtained in the comparing process in step S2102 with the byte data in the old EXE file 305 defined as a key in step S2106.

$$ROLDNEW = (\text{number of matching bytes between old and new files}) / \{(\text{number of matching bytes between old and new files}) + (\text{number of non-matching bytes between old and new files})\} \quad (2)$$

According to the following equation, it is determined whether or not the rate RNEWOLD of the number of the matching bytes with the new EXE file 306 defined as a key is lower than the rate ROLDNEW of the number of the matching bytes with the old EXE file 305 defined as a key.

$$RNEWOLD/ROLDNEW < 1? \quad (3)$$

Since the update file 307 stores the difference information about non-matching data, it is desirable that there are the most possible matching data. Therefore, if the rate RNEWOLD of the number of the matching bytes with the new EXE file 306 defined as a key is lower than the rate ROLDNEW of the number of the matching bytes with the old EXE file 305 defined as a key, and if the determination in step S2106 indicates "Yes", then selected in step S2107 is the result of the comparing process in step S2104 performed when the old EXE file 305 is defined as a key. Then, written to the update file 307 shown in FIG. 3 in step S2109 is the difference information about the non-matching data obtained in the comparing process. On the other hand, if the rate RNEWOLD of the number of the matching bytes with the new EXE file 306 defined as a key is higher than the rate ROLDNEW of the number of the matching bytes with the old EXE file 305 defined as a key, and if the determination in step S2106 indicates "No", then selected in step S2108 is the result of the comparing process in step S2102 performed when the new EXE file 306 is defined as a key. Then, written to the update file 307 shown in FIG. 3 in step S2109 is the difference information about the non-matching data obtained in the comparing process.

Since, in the example shown in FIGS. 24A and 24B, RNEWOLD is equal to ROLDNEW, selected in step S2108 is the result of the comparing process in step S2102 performed when the new EXE file 306 is defined as a key. Then, written to the update file 307 in step S2109 is the difference information about the non-matching data which is obtained in the comparing process and indicates that the bite data II ... I have been added in the new EXE file 306 immediately after the address represented by the byte data c of the old EXE file 305.

After the process in step S2109, the next start-of-comparison position is set in step S2110, and control is returned to the processes in and after step S2101. In the example shown in FIG. 24A, the next start-of-comparison position in the new EXE file 306 is pointed to by the address of the byte data d stored in the variable src when the determination in step S2204 shown in FIG. 22 indicates "Yes". The next start-of-comparison position in the old EXE file 305 is also pointed to by the address of the byte data d stored in the variable dist at that time. Hereafter, starting at these start-of-comparison positions, similar comparing processes are repeatedly performed.

If there are no byte data to be compared in the specified areas between the old EXE file 305 and the new EXE file 306, then the determination in step S2101 indicates "Yes" and the difference extracting process terminates for the specified areas.

Figure 25A:
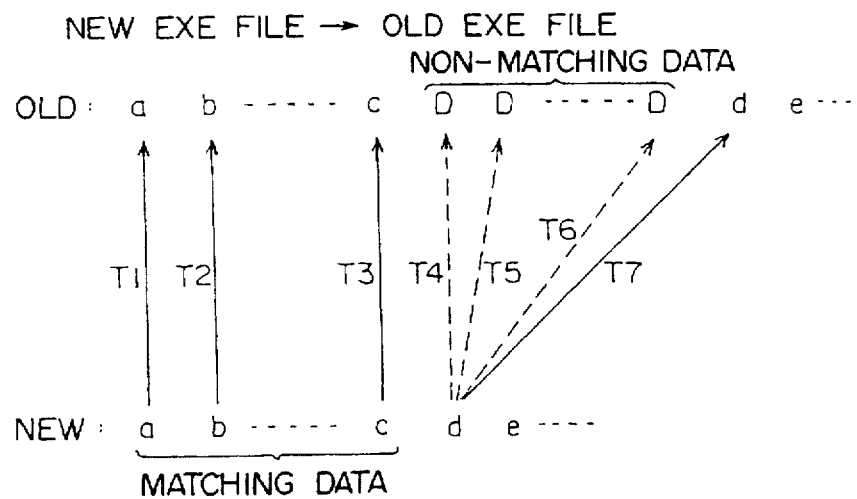
FIGS. 25A and 25B show the difference extracting process performed when a new EXE file indicates the deletion of data.

FIG. 25A shows an example in which the area of the byte data string DD ... D between the byte data in the specified areas in the old EXE file 305 has been deleted in the specified area in the new EXE file 306.

In this case, as shown in FIG. 25A, a comparing process is performed with the specified area in the new EXE file 306 set as reference data and the specified area in the old EXE file 305 set as a comparison object in step S2102. The data in the comparison reference bytes are used as a key in the comparing process.

The comparing process is performed similarly to the case shown in FIG. 24B except that the comparison reference and the comparison object replace each other. As a result of the comparing process, calculated are the start-of-matching point and the number of matching bytes represented by the byte data ab ... c of the old EXE file 305 and the new EXE file 306 shown in FIG. 25A. Calculated likewise are the start-of-non-matching point and the number of non-matching bytes represented by the byte data DD ... D deleted from the old EXE file 305, thereby terminating the comparing process.

If associated matching and non-matching data are detected as a result of the above described comparing process in step S2102 shown in FIG. 21 in which the byte data in the specified area in the old EXE file 305 are compared with the key of each byte data in the specified area in the new EXE file 306, then it is determined in step S2103 whether or not the number of the above described matching bytes is larger than 64.

If the number of the matching bytes is larger than 64 and the determination in step S2103 indicates "Yes", then the difference information about the above described non-matching data is written to the update file 307 in FIG. 3 in step S2109.

Figure 25B:
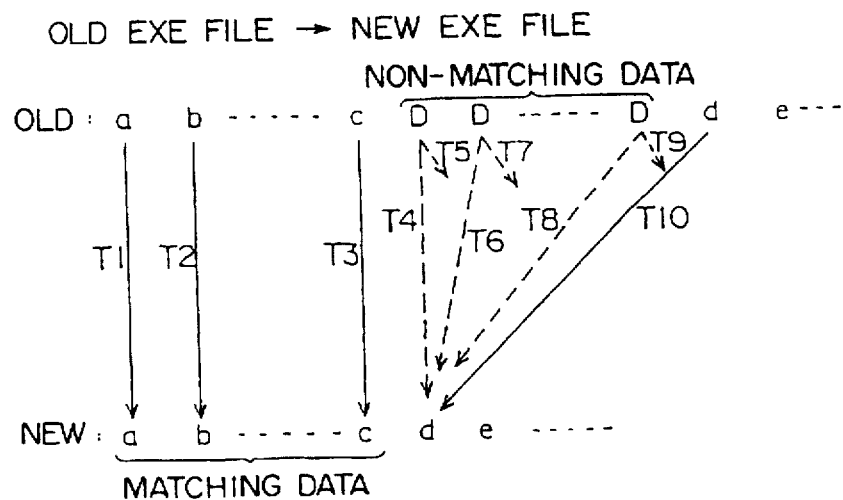

If the number of the matching bytes is smaller than 64 and the determination in step S2103 indicates "No", then in reverse to the case in the above described step S2102 in step S2104, a comparing process is performed with the specified area in the old EXE file 305 set as reference data and the specified area in the new EXE file 306 set as a comparison object in step S2104. The data in the comparison reference bytes are used as a key in the comparing process shown in FIG. 22. FIG. 25B shows an example of the comparing process corresponding to that shown in FIG. 25B. The comparing process is similar to that shown in FIG. 24A except that the comparison reference and the comparison object replace each other. As a result of the comparing process, calculated are the start-of-matching point and the number of matching bytes represented by the byte data ab ... c of the old EXE file 305 and the new EXE file 306 shown in FIG. 25B. Calculated likewise are the start-of-non-matching point and the number of non-matching bytes represented by the byte data DD ... D deleted from the old EXE file 305, thereby terminating the comparing process.

If associated matching and non-matching data are detected as a result of the above described comparing process in step S 2104 shown in FIG. 21 in which the byte data in the specified area in the new EXE file 306 are compared with the key of each byte data in the specified area in the new old EXE file 305, then it is determined in step S2105 whether or not all bytes are non-matching bytes.

Since all bytes are not non-matching bytes in the examples shown in FIGS. 25A and 25B, and the determination in step S2105 indicates "No", it is determined whether or not the rate RNEWOLD of the number of the matching bytes with the new EXE file 306 defined as a key is lower than the rate ROLDNEW of the number of the matching bytes with the old EXE file 305 defined as a key. The determination is made according to the above described equations (1), (2), and (3).

Since, in the example shown in FIGS. 25A and 25B, RNEWOLD is equal to ROLDNEW, selected in step S2108 is the result of the comparing process in step S2102 performed when the new EXE file 306 is defined as a key. Then, written to the update file 307 in step S2109 is the difference information about the deletion of the byte data DD ... D between the byte data c and d in the old EXE file 305.

Figure 26A:
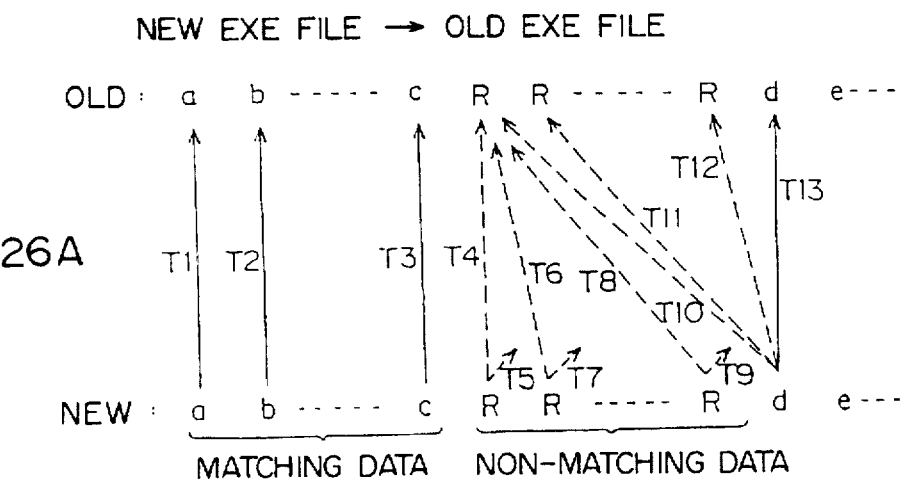
FIGS. 26A and 26B show the difference extracting process performed when a new EXE file indicates the replacement of data.

FIG. 26A shows an example where the area of the byte data string RR ... R existing between the byte data c and d in the specified area in the old EXE file 305 is replaced with another byte data string RR ... R having the same length as the byte data string RR ... R in a specified area in the new EXE file 306.

In this case, as shown in FIG. 26A, a comparing process is performed with the specified area in the new EXE file 306 set as reference data and the specified area in the old EXE file 305 set as a comparison object in step S2102. The data in the comparison reference bytes are used as a key in the comparing process. The comparing process at T1 through T9 shown in FIG. 26A is the same as that performed at T1 through T9 shown in FIG. 24A. The comparing process at T10 through T13 shown in FIG. 26A is the same as that performed at T4 through T7 shown in FIG. 25A. As a result of the comparing process, calculated are the start-of-matching point and the number of matching bytes represented by the byte data ab ... c of the old EXE file 305 and the new EXE file 306 shown in FIG. 26A. Calculated likewise are the start-of-non-matching point and the number of non-matching bytes represented by the byte data RR ... R replaced in the new EXE file 306, thereby terminating the comparing process.

If associated matching and non-matching data are detected as a result of the above described comparing process in step S2102 shown in FIG. 21 in which the byte data in the specified area in the old EXE file 305 are compared with the key of each byte data in the specified area in the new EXE file 306, then it is determined in step S2103 whether or not the number of the above described matching bytes is larger than 64.

If the number of the matching bytes is larger than 64 and the determination in step S2103 indicates "Yes", then the difference information about the above described non-matching data is written to the update file 307 in FIG. 3 in step S2109.

Figure 26B:
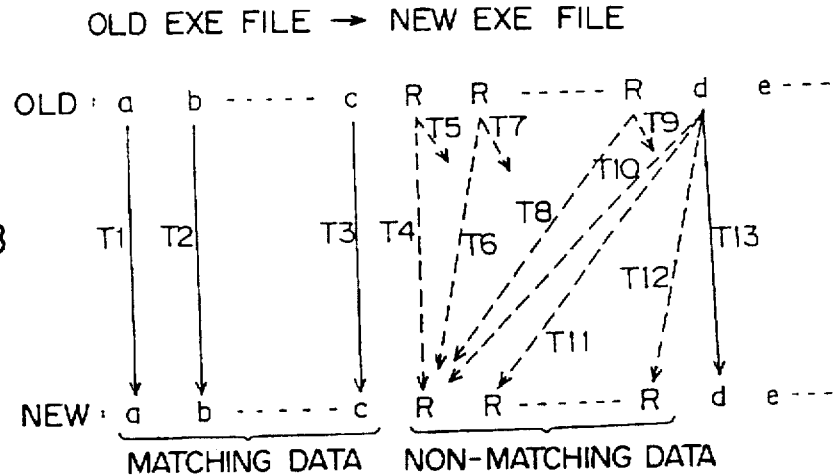

If the number of the matching bytes is smaller than 64 and the determination in step S2103 indicates "No", then in reverse to the case in the above described step S2102 in step S2104, a comparing process is performed with the specified area in the old EXE file 305 set as reference data and the specified area in the new EXE file 306 set as a comparison object in step S2104. The data in the comparison reference bytes are used as a key in the comparing process shown in FIG. 22. FIG. 26B shows an example of the comparing process corresponding to that shown in FIG. 26A. The comparing process at T1 through T9 shown in FIG. 26B is the same as that performed at T1 through T9 shown in FIG. 25B. The comparing process at T10 through T13 shown in FIG. 26B is the same as that performed at T4 through T7 shown in FIG. 24B. As a result of the comparing process, calculated are the start-of-matching point and the number of matching bytes represented by the byte data ab ... c of the old EXE file 305 and the new EXE file 306 shown in FIG. 26B. Calculated likewise are the start-of-non-matching point and the number of non-matching bytes represented by the byte data RR ... R replaced in the new EXE file 306, thereby terminating the comparing process.

If associated matching and non-matching data are detected as a result of the above described comparing process in step S2104 shown in FIG. 21 in which the byte data in the specified area in the new EXE file 306 are compared with the key of each byte data in the specified area in the old EXE file 305, then it is determined in step S2105 whether or not all bytes are matching bytes.

Since all bytes are not non-matching bytes in the examples shown in FIGS. 26A and 26B, and the determination in step S2105 indicates "No", it is determined whether or not the rate RNEWOLD of the number of the matching bytes with the new EXE file 306 defined as a key is lower than the rate ROLDNEW of the number of the matching bytes with the old EXE file 305 defined as a key. The determination is made according to the above described equations (1), (2), and (3).

Since, in the example shown in FIGS. 26A and 26B, RNEWOLD is equal to ROLDNEW, selected in step S2108 is the result of the comparing process in step S2102 performed when the new EXE file 306 is defined as a key. Then, written to the update file 307 in step S2109 is the difference information about the replacement of the byte data RR ... R between the byte data c and d in the old EXE file 305.

Figure 27A:
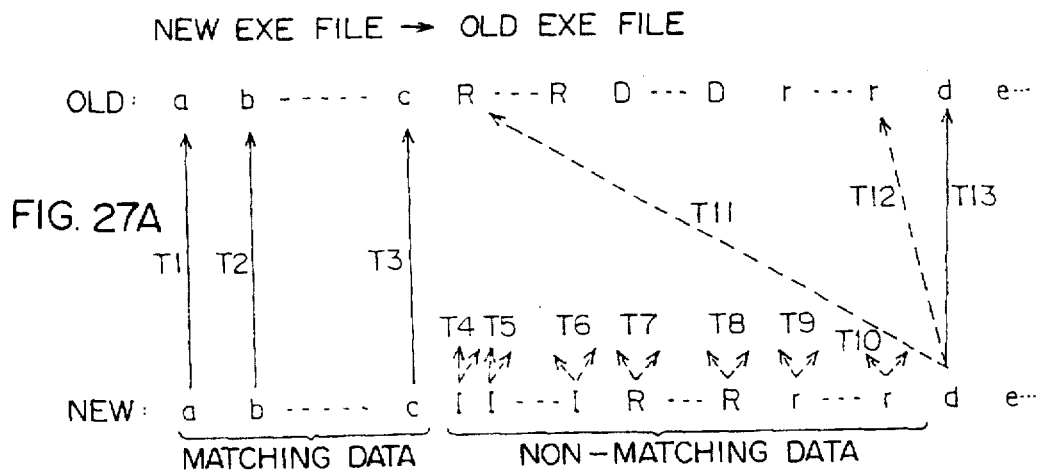
FIGS. 27A and 27B show the difference extracting process performed when a new EXE file indicates the addition, deletion, and replacement of data.

FIG. 27A shows an example where, in a specified area of the new EXE file 306, the area of the byte data strings RR ... R and r ... r existing between the byte data c and d in the specified area in the old EXE file 305 is replaced with another byte data strings RR ... R and rr ... r having the same length as the byte data string RR ... R, the byte data string DD ... D is deleted, and a new byte data string II ... I is added between the byte data c and d in the specified area of the old EXE file 305.

In this case, as shown in FIG. 27A, a comparing process is performed with the specified area in the new EXE file 306 set as reference data and the specified area in the old EXE file 305 set as a comparison object in step S2102. The data in the comparison reference bytes are used as a key in the comparing process. As in the case shown in FIG. 26A, the comparing process at T1 through T10 shown in FIG. 27A is the same as that performed at T1 through T9 shown in FIG. 24A. The comparing process at T11 through T13 shown in FIG. 27A is the same as that performed at T4 through T7 shown in FIG. 25A. As a result of the comparing process, calculated are the start-of-matching point and the number of matching bytes represented by the byte data ab ... c of the old EXE file 305 and the new EXE file 306 shown in FIG. 27A. Calculated likewise are the start-of-non-matching point and the number of non-matching bytes represented by the byte data I ... IR ... Rr ... r added, deleted, and replaced as the new EXE file 306, thereby terminating the comparing process.

If associated matching and non-matching data are detected as a result of the above described comparing process in step S2102 shown in FIG. 21 in which the byte data in the specified area in the old EXE file 305 are compared with the key of each byte data in the specified area in the new EXE file 306, then it is determined in step S2103 whether or not the number of the above described matching bytes is larger than 64.

If the number of the matching bytes is larger than 64 and the determination in step S2103 indicates "Yes", then the difference information about the above described non-matching data is written to the update file 307 in FIG. 3 in step S2109.

Figure 27B:
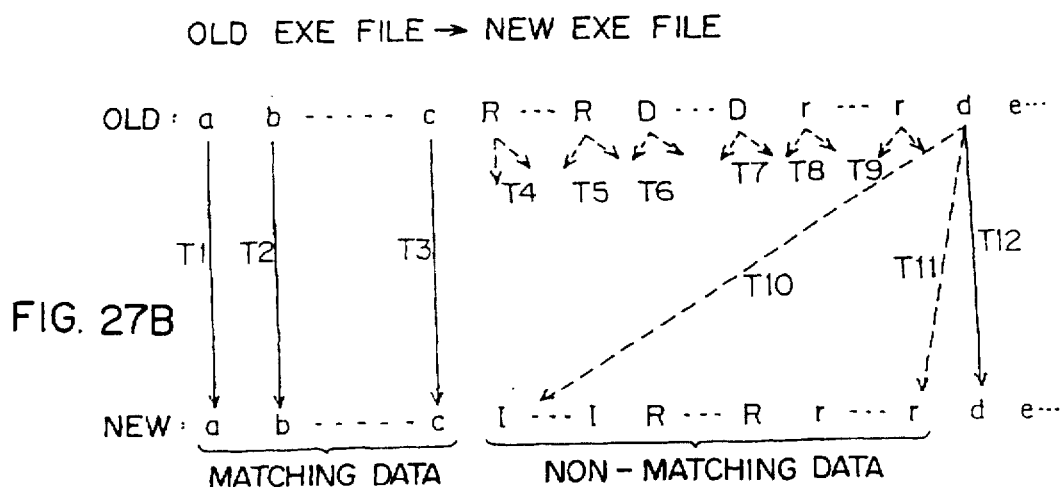

If the number of the matching bytes is smaller than 64 and the determination in step S2103 indicates "No", then in reverse to the case in the above described step S2102 in step S2104, a comparing process is performed with the specified area in the old EXE file 305 set as reference data and the specified area in the new EXE file 306 set as a comparison object in step S2104. The data in the comparison reference bytes are used as a key in the comparing process shown in FIG. 22. FIG. 27B shows an example of the comparing process corresponding to that shown in FIG. 27A. As in the case shown in FIG. 26B, the comparing process at T1 through T9 shown in FIG. 27B is the same as that performed at T1 through T9 shown in FIG. 25B. The comparing process at T10 through T12 shown in FIG. 27B is the same as that performed at T4 through T7 shown in FIG. 24B. As a result of the comparing process, calculated are the start-of-matching point and the number of matching bytes represented by the byte data ab ... c of the old EXE file 305 and the new EXE file 306 shown in FIG. 27B. Calculated likewise are the start-of-non-matching point and the number of non-matching bytes represented by the byte data I ... IR ... Rr ... r added, deleted, and replaced in the new EXE file 306, thereby terminating the comparing process.

If associated matching and non-matching data are detected as a result of the above described comparing process in step S 2104 shown in FIG. 21 in which the byte data in the specified area in the new EXE file 306 are compared with the key of each byte data in the specified area in the old EXE file 305, then it is determined in step S2105 whether or not all bytes are non-matching bytes.

Since all bytes are not non-matching bytes in the examples shown in FIGS. 27A and 27B, and the determination in step S2105 indicates "No", it is determined whether or not the rate RNEWOLD of the number of the matching bytes with the new EXE file 306 defined as a key is lower than the rate ROLDNEW of the number of the matching bytes with the old EXE file 305 defined as a key. The determination is made according to the above described equations (1), (2), and (3).

Since, in the example shown in FIGS. 27A and 27B, RNEWOLD is equal to ROLDNEW, selected in step S2108 is the result of the comparing process in step S2102 performed when the new EXE file 306 is defined as a key. Then, written to the update file 307 in step S2109 is the difference information.

If the number of bytes between the byte data c and d in a specified area in the old EXE file 305 is larger than the number of bytes between the byte data c and d in a specified area in the new EXE file 306 in FIG. 27A, then the difference information about the replacement of the corresponding byte data of the number counted in the new EXE file 306 is written to the update file 307. Then, written to the update file 307 is the difference information about the deletion of the byte data of the number obtained by the equation {(number of the corresponding bytes counted in the old EXE file 305)–(number of the corresponding bytes counted in the new EXE file 306)}.

In reverse, if the number of bytes between the byte data c and d in a specified area in the old EXE file 305 is smaller than the number of bytes between the byte data c and d in a specified area in the new EXE file 306 in FIG. 27A, then the difference information about the replacement of the corresponding byte data of the number counted in the old EXE file 305 is written to the update file 307. Then, written to the update file 307 is the difference information about the deletion of the byte data of the number obtained by the equation {(number of the corresponding bytes counted in the new EXE file 306)–(number of the corresponding bytes counted in the old EXE file 305)}.

If the number of bytes between the byte data c and d in a specified area in the old EXE file 305 is equal to the number of bytes between the byte data c and d in a specified area in the new EXE file 306 in FIG. 27A, then the difference information about the replacement of the corresponding byte data of the number counted in the old EXE file 305 or the new EXE file 306 is written to the update file 307.

Figure 28A:
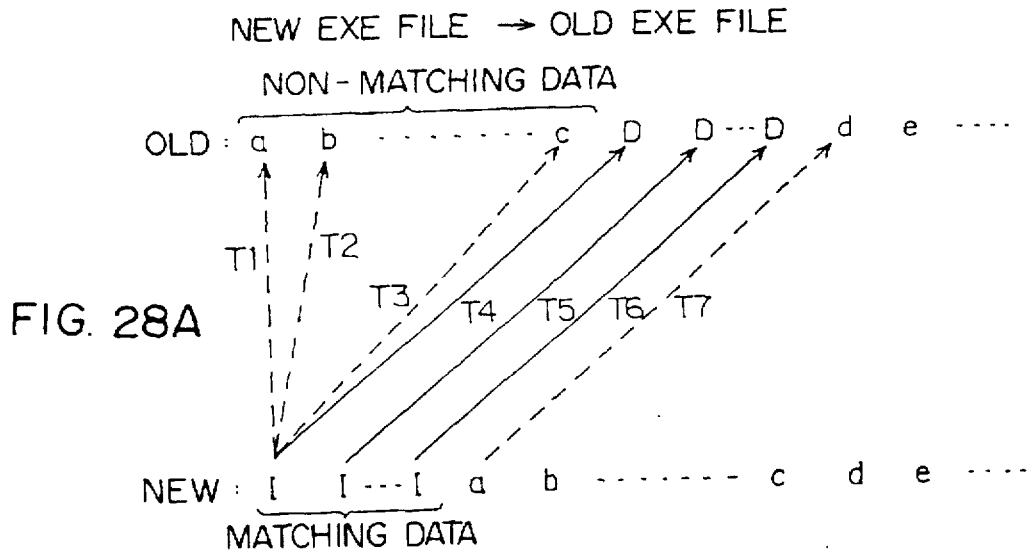
FIGS. 28A and 28B show the difference extracting process performed when a new EXE file indicates special addition and deletion simultaneously carried out to its old EXE file.
Figure 28B:
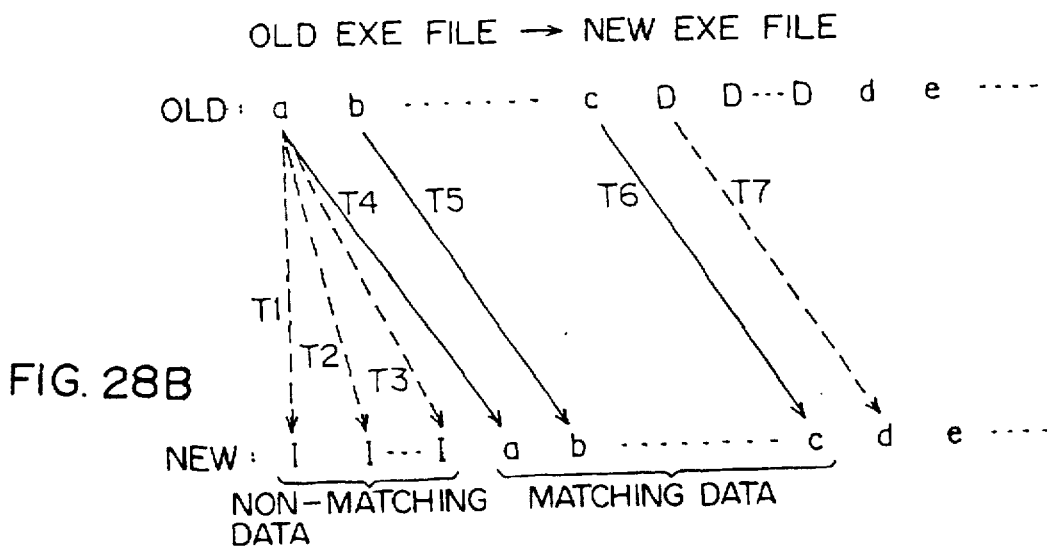

Finally, FIGS. 28A and 28B show special examples in which the byte data string II . . . I is added immediately before the leading byte data a in a specified area in the new EXE file 306, and the byte data string DD . . . D between the byte data c and d in a specified area in the old EXE file 305 is deleted. In this case, the added byte data string II . . . I incidentally matches the deleted byte data string DD . . . D.

As shown in FIG. 28A, a comparing process is performed with the specified area in the new EXE file 306 set as reference data and the specified area in the old EXE file 305 set as a comparison object in step S2102. The data in the comparison reference bytes are used as a key in the comparing process. The comparing process at T1 through T3 shown in FIG. 28A is the same as that performed at T4 through T6 shown in FIG. 25A. The comparing process at T4 through T6 shown in FIG. 28A is the same as that performed at T1 through T3 shown in FIG. 24A. In the comparison at T3 and T4 shown in FIG. 28A, after the first byte data I added to the new EXE file 306 has not matched any of the byte data a b . . . c in the old EXE file 305, the first byte data I added to the new EXE file 306 matches the first byte data D already deleted in the new EXE file 306. Thus, the determination in step S2205 indicates "No".

After the process at T6 shown in FIG. 28A, in step S2206, the address of the byte data a in the new EXE file 306 is assigned to the variable src and the address of the byte data d in the old EXE file 305 is assigned to the variable dist. When the process in step S2204 is performed, the byte data a in the new EXE file 306 at the address indicated by the variable src does not match the byte data d in the old EXE file 305 at the address indicated by the variable dist. Then, the determination indicates "No". The non-matching state refers to the state reached when a non-matching state is reached after a non-matching result is output from the comparison between the bytes data II . . . I embedded in the new EXE file 306 and the byte data a b . . . c in the old EXE file 305, and after the byte data II . . . I added in the new EXE file 305 matches the byte data DD . . . D deleted from the old EXE file 305. Thus, the determination in step S2207 indicates "Yes", and the process is performed in step S2211. In step S2211, calculated are the start-of-non-matching data and the number of non-matching bytes represented by the byte data ab . . . c in the old EXE file 305 shown in FIG. 28A. Then, calculated are the start-of-matching data and the number of matching bytes represented by the byte data II . . . I added to the new EXE file 306 and the byte data DD . . . D deleted from the old EXE file 305. Then, the comparing process terminates.

As a result of the above described processes, if associated matching data and non-associated matching data are detected in the comparing process in step S2102 shown in FIG. 21 performed on each byte data in a specified area in the old EXE file 305 with each byte data in a specified area in the new EXE file 306 defined as a key, then it is determined in step S2103 whether or not the number of the matching bytes exceeds 64 bytes.

If the number of the matching bytes in the byte data string II . . . I (=DD . . . D) refers to a small number, for example, only a few bytes, and the number of the non-matching bytes in the byte data string ab . . . c refers to a large number in FIG. 28A, then the matching data are small in number while the non-matching data are large.

In such a case, the determination in step S2103 indicates "No", and then in reverse to the process in step S 2102, a comparing process is performed in step S2104 as shown in FIG. 22 with the specified area in the old EXE file 305 set as reference data and the specified area in the new EXE file 306 set as a comparison object. The data in the comparison reference bytes are used as a key in the comparing process. FIG. 28B shows the operation corresponding to that shown in FIG. 28A as an example of the comparing process. The comparing process at T1 through T3 shown in FIG. 28B is the same as that performed at T4 through T6 shown in FIG. 24B. The comparing process at T4 through T6 shown in FIG. 28B is the same as that performed at T1 through T3 shown in FIG. 24B.

After the process at T6 shown in FIG. 28B, in step S2206, the address of the byte data D in the old EXE file 305 is assigned to the variable src and the address of the byte data d in the new EXE file 306 is assigned to the variable dist. When the process in step S2204 is performed, the byte data D in the old EXE file 305 at the address indicated by the variable src does not match the byte data d in the new EXE file 306 at the address indicated by the variable dist. Then, the determination indicates "No". The non-matching state refers to the state reached when a non-matching state is reached after a non-matching result is output from the comparison between the bytes data a in the old EXE file 305 and the byte data II . . . I added in the new EXE file 306, and after the byte data ab . . . c added in the old EXE file 305 matches the byte data ab ... c in the new EXE file 306. Thus, the determination in step S2207 indicates "Yes", and the process is performed in step S2211. In step S2211, calculated are the start-of-non-matching data and the number of non-matching bytes represented by the byte data II . . . I in the new EXE file 306 shown in FIG. 28B. Then, calculated are the start-of-matching data and the number of matching bytes represented by the byte data ab . . . c in the old EXE file 305 and the new EXE file 306. Then, the comparing process terminates.

As a result of the above described processes, if associated matching data and non-associated matching data are detected in the comparing process in step S2104 shown in FIG. 21 performed on each byte data in a specified area in the new EXE file 306 with each byte data in a specified area in the old EXE file 305 defined as a key, then it is determined in step S2105 whether or not the number of the matching bytes exceeds 64 bytes.

Since all bytes are not non-matching bytes in the examples shown in FIGS. 28A and 28B, and the determination in step S2105 indicates "No", it is determined whether or not the rate RNEWOLD of the number of the matching bytes with the new EXE file 306 defined as a key is lower than the rate ROLDNEW of the number of the matching bytes with the old EXE file 305 defined as a key. The determination is made according to the above described equations (1), (2), and (3).

If the number of the matching bytes in the byte data string ab ... c refers to a large number, and the number of the non-matching bytes in the byte data string II ... I refers to a small number, for example, a few bytes in FIG. 28B, then the matching data are large in number while the non-matching data are small.

Accordingly, RNEWOLD is smaller than ROLDNEW in the examples shown in FIGS. 28A and 28B. Since the update file 307 stores the difference information about non-matching data, it is desirable that there are the most possible matching data. Therefore, as shown in FIGS. 28A and 28B, if the rate RNEWOLD of the number of the matching bytes with the new EXE file 306 defined as a key is lower than the rate ROLDNEW of the number of the matching bytes with the old EXE file 305 defined as a key, and if the determination in step S2106 indicates "Yes", then selected in step S2107 is the result of the comparing process in step S2104 performed when the old EXE file 305 is defined as a key. Then, written to the update file 307 shown in FIG. 3 in step S2109 is the difference information about the non-matching data obtained in the comparing process indicating that the byte data II ... I is added in the new EXE file 306 before the address represented by the byte data a in the old EXE file 305.

Thus, the difference extracting process is performed in the difference extracting unit 304.

FIGS. 29A and 29B shows the data structure of the update file 307.

Each record in the update file 307 consists of RdcordID indicating the attribute of the record, DataOffset indicating the process position in the record, DataLength indicating the length of the actual data, and Data[n] indicating the array of the actual updated data as shown in FIG. 29A.

FIG. 29B shows the attribute of RdcordID.

If the value of RdcordID is 0, then it refers to a replacement record. That is, the data represented by the actual data array Data[n] replaces the data having the data length represented by DataLength and starting at the position specified by DataOffset in the old EXE file 305.

If the value of RdcordID is 1, then it refers to an added record. That is, added is the data represented by the actual data array Data[n] having the data length represented by DataLength and starting at the position specified by DataOffset in the old EXE file 305.

If the value of RdcordID is 2, then it refers to a deleted record. That is, deleted is the data having the data length represented by DataLength and starting at the position specified by DataOffset in the old EXE file 305. In this case, the actual data array Data[n] is not given.

The old EXE file 305 can be updated according to the update file 307 generated as described above by retrieving records one after another from the update file 307 and performing an updating process on each of them for each record attribute.

The above listed embodiments are applied to a difference extracting process performed on an executable file operated by an OS/2 system. The difference extracting process is performed after associating data for each of the logic units including a DOS EXE format area, an OS/2 EXE header area, a table unit area, a segment data area, and a resource area. However, the present invention is not limited to these applications, but the difference extracting process can be performed after the data are associated in page data units.

Figure 30:
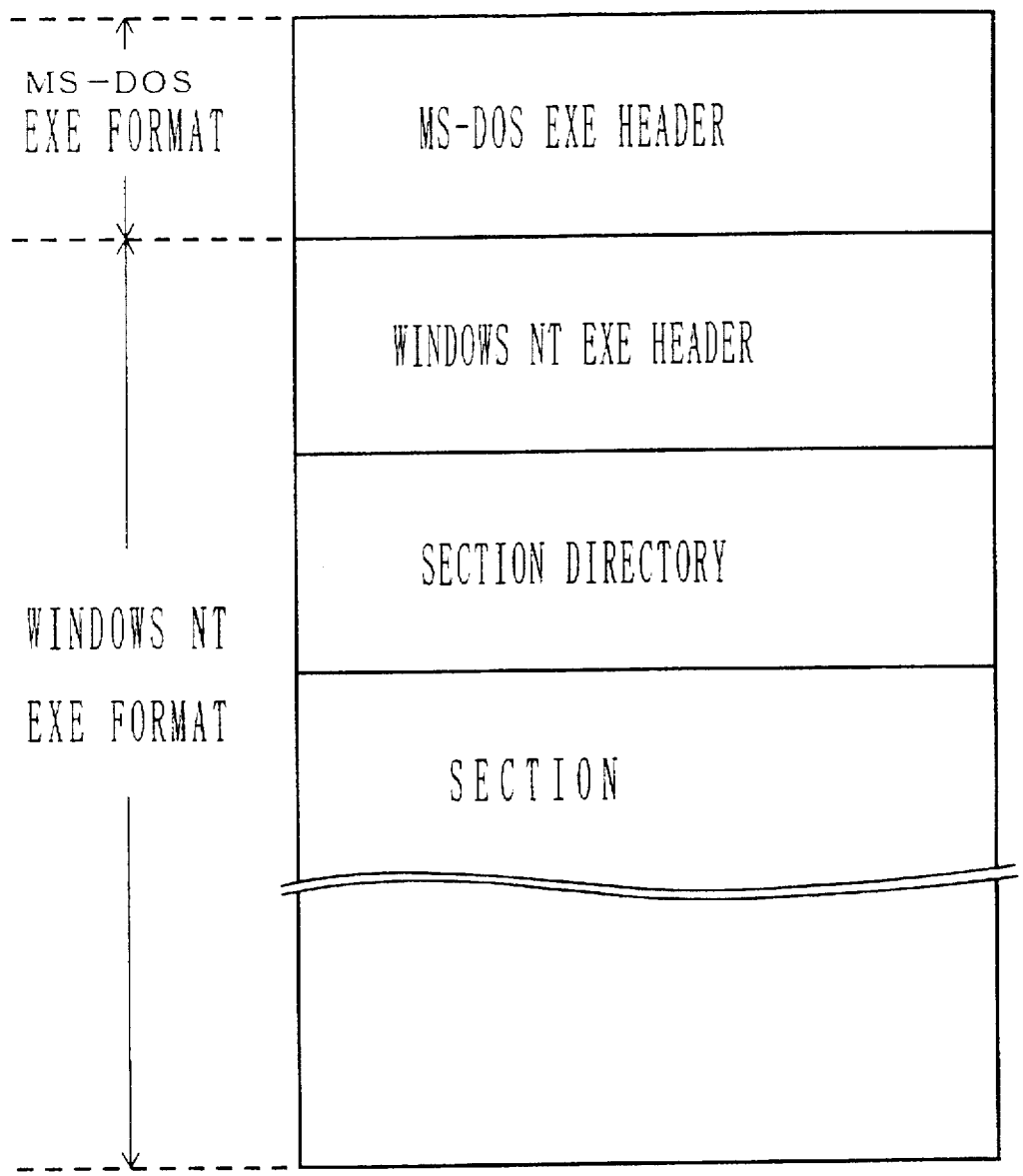
FIG. 30 shows a file format according to a preferred embodiment of the present invention.

FIG. 30 shows an example of a format of an executable file in a WindowsNT operating system.

A technology according to the present invention described above can be applied to an extracting of a difference between the executable files.

As in the case of the executable file shown in FIG. 4, an executable file structured as shown in FIG. 30 can be designed to be executed in an MS-DOS system which is one of the conventional single task operating systems for computers. Therefore, the executable file consists of an MS-DOS formatted area and a WindowsNT EXE formatted area as shown in FIG. 30.

The MS-DOS formatted area forms the first half of the file. The MS-DOS area consists of an MS-DOS EXE header area and an MS-DOS load module area. The MS-DOS EXE header area stores various information for use in executing an MS-DOS program and pointer information pointing to a WindowsNT EXE header described later. The MS-DOS load module area is not shown in the drawings, but stores the body of a program operating in an MS-DOS system.

The WindowsNT EXE formatted area forms the second half of the file. The WindowsNT EXE area consists of a WindowsNT EXE header area, a section directory area, a section area, etc. The WindowsNT EXE header area stores various information for use in executing a WindowsNT program. The section directory area is used in referring to the section area described later. The section area stores the body of a program operating in a WindowsNT system referred to through the section directory area.

When the difference extracting process is performed on the above formatted executable file, the difference extracting process can be performed between an old EXE file and a new EXE file for each of the logic areas such as the MS-DOS EXE header area, the WindowsNT EXE header area, the section directory area, the section area, etc. as in the above described preferred embodiments.

In this case, data can be checked, as in the above described preferred embodiments, made in steps S501 through S504 shown in FIG. 5 by determining various information, for example in the MS-DOS EXE header area.

The leading address in the WindowsNT EXE header area can be obtained according to the offset address set in the MS-DOS EXE header area. The range of the WindowsNT EXE header area can be obtained by referring to the header size set in the area.

The leading address of the section directory area can be obtained as being preceded by the above mentioned WindowsNT EXE header area. The range of the section directory area can be obtained by referring to the number of sections set in the WindowsNT EXE header area.

Using the information in the section directory area, each position of a plurality of section areas can be obtained.

The difference extracting process can be performed between the old EXE file and the new EXE file by activating for each area obtained as described above a module similar to the difference extracting unit 304 in the above described embodiment shown in FIG. 3.

Even when various tables and resources are added to the above mentioned file, the difference extracting process can be performed between the old EXE file and the new EXE file after associating file areas for each logic unit as in the process performed in the above described embodiment.

Industrial Applicability

Since a difference extracting process is performed after associating file areas for each logic unit according to the present invention, there is a strong probability that the data in respective areas match each other between the old EXE file and new EXE file. As a result, the size of a generated update file can be considerably reduced.

Thus, in comparison with a conventional method where a new EXE file is transferred as is, the utilization of a circuit can be greatly improved according to the present invention when, for example, an update file is transferred over a network.

What is claimed is:

1. An executable file difference extracting device for extracting an update file for use in updating an old executable file into a new executable file, the update file referring to a difference between the new executable file and the old executable file, comprising:

logic unit area dividing means for dividing each of the old executable file and the new executable file into a plurality of logic unit areas each of which has a predetermined function;

logic unit area associating means for associating each of said logic units area in the old executable file with a corresponding logic unit area in the new executable file;

difference extracting means for extracting difference information between data in the logic unit area in the old executable file and the functionally corresponding logic unit area in the new executable file associated by logic unit area associating means; and update file generating means for storing in the update file said difference information extracted by said difference extracting means, and extracting and storing in the update file the difference information about an logic unit area in the old executable file or the new executable file not associated by said logic unit area associating means.

2. The executable file difference extracting device according to claim 1, wherein said logic unit area can be a segment area, resource area, header area, or table area.

3. The executable file difference extracting device according to claim 1, wherein said logic unit area can be a section area, section directory area, or header area.

4. The executable file difference extracting device according to claim 1, wherein said difference information comprises attribute information about addition, deletion, or replacement of data made to said old executable file to be updated into said new executable file; data length information of object data; and the object data.

5. The executable file difference extracting device, according to claim 1, further comprising:

file updating means for sequentially retrieving the difference information from said update file, and generating said new executable file based on the difference information and said old executable file.

6. An executable file difference extracting/updating device which generates an update file by extracting a difference between a new executable file and an old executable file and then generates the new executable file based on the old executable file and the update file, comprising:

logic unit area dividing means for dividing each of the old executable file and the new executable file into a plurality of logic unit areas each of which has a predetermined function;

logic unit area associating means for associating each of said logic unit area in the old executable file with a functionally corresponding logic unit area in the new executable file;

difference extracting means for extracting difference information between data in the logic unit area in the old executable file and the functionally corresponding logic unit area in the new executable file;

update file generating means for storing in the update file said difference information extracted by said difference extracting means, and extracting and storing in the update file the difference information about a logic unit area in the old executable file or the new executable file not associated by said logic unit area associating means; and file updating means for sequentially retrieving the difference information from said update file, and generating said new executable file based on the difference information and said old executable file.

7. An executable file difference extracting method for extracting an update file for use in updating an old executable file into a new executable file, the update file referring to a difference between the new executable file and the old executable file, comprising the steps of:

dividing each of the old executable file and the new executable file into a plurality of logic unit areas each of which has a predetermined function;

associating each of said logic unit area in the old executable file with a functionally corresponding logic unit area in the new executable file;

extracting difference information between data in the logic unit area in the old executable file and the functionally corresponding logic unit area in the new executable file among the plurality of areas of said old executable file and said new executable file; and storing in the update file said difference information extracted in said difference extracting step, and extracting and storing in the update file the difference information about a logic unit area in the old executable file or the new executable file not associated in said logic unit area associating step.

* * * * *